(12) United States Patent
Dicke et al.

(10) Patent No.: US 12,583,348 B2
(45) Date of Patent: Mar. 24, 2026

(54) ELECTRIC VEHICLE CHARGING SYSTEM WITH TWO STAGE DC CHARGING

(71) Applicant: EVJAM LLC, Minneapolis, MN (US)

(72) Inventors: Steven Dicke, St. Paul, MN (US); Gregg Kromrey, Hudson, WI (US)

( * ) Notice: Subject to any disclaimer, the term of this patent is extended or adjusted under 35 U.S.C. 154(b) by 128 days.

(21) Appl. No.: 18/542,514

(22) Filed: Dec. 15, 2023

(65) Prior Publication Data

US 2024/0208348 A1     Jun. 27, 2024

Related U.S. Application Data

(63) Continuation of application No. 18/385,333, filed on Oct. 30, 2023.

(60) Provisional application No. 63/432,866, filed on Dec. 15, 2022, provisional application No. 63/423,247, filed on Nov. 7, 2022, provisional application No. 63/420,476, filed on Oct. 28, 2022.

(51) Int. Cl.
| | |
|---|---|
| *B60L 53/35* | (2019.01) |
| *B60L 53/10* | (2019.01) |
| *B60L 53/30* | (2019.01) |
| *B60L 53/67* | (2019.01) |
| *B60L 58/10* | (2019.01) |
| *H02J 7/00* | (2006.01) |
| *H02J 7/02* | (2016.01) |

(52) U.S. Cl.
CPC .............. *B60L 53/35* (2019.02); *B60L 53/11* (2019.02); *B60L 53/30* (2019.02); *B60L 53/67* (2019.02); *B60L 58/10* (2019.02); *H02J 7/0042* (2013.01); *H02J 7/02* (2013.01); *B60L 2210/30* (2013.01)

(58) Field of Classification Search
CPC .......... B60L 53/11; B60L 53/14; B60L 53/30; B60L 53/35; B60L 53/37; B60L 53/67; B60L 2210/10; H02J 7/0042; H02J 7/02; H02J 7/04; H02J 2310/48; H02J 5/00
See application file for complete search history.

(56) References Cited

U.S. PATENT DOCUMENTS

| | | | | |
|---|---|---|---|---|
| 2014/0354229 A1* | 12/2014 | Zhao | ...................... | B60L 53/68 |
| | | | | 320/109 |
| 2018/0339601 A1* | 11/2018 | Kruszelnicki | ........... | B60L 53/16 |
| 2020/0091753 A1* | 3/2020 | Maruyama | ............ | H02M 7/217 |
| 2020/0136520 A1* | 4/2020 | Jimenez Pino | ......... | B60L 53/20 |
| 2020/0164755 A1* | 5/2020 | Smolenaers | ............ | B60L 53/53 |
| 2020/0180446 A1* | 6/2020 | King | ...................... | B60L 50/51 |
| 2020/0353828 A1* | 11/2020 | Kristof | .................. | B60L 53/11 |
| 2022/0355681 A1* | 11/2022 | King | .................... | H02J 7/0029 |
| 2024/0097551 A1* | 3/2024 | Hartmann | ............. | H02M 1/007 |

* cited by examiner

*Primary Examiner* — Erick R Solis

(57) ABSTRACT

One or more examples provide an electric vehicle or a device for use with an electric vehicle, including an electric vehicle charging system and method. In one example, an electric vehicle charging system with two stage DC charging is disclosed. The charging system can include a charging robot.

20 Claims, 19 Drawing Sheets

100

110

P

AC or DC

SYSTEM
CONTROLLER

112

V1

BIB 114a

116

V2

V3

BIB 114b

116

V4

112

V5

BIB 114c

116

V6

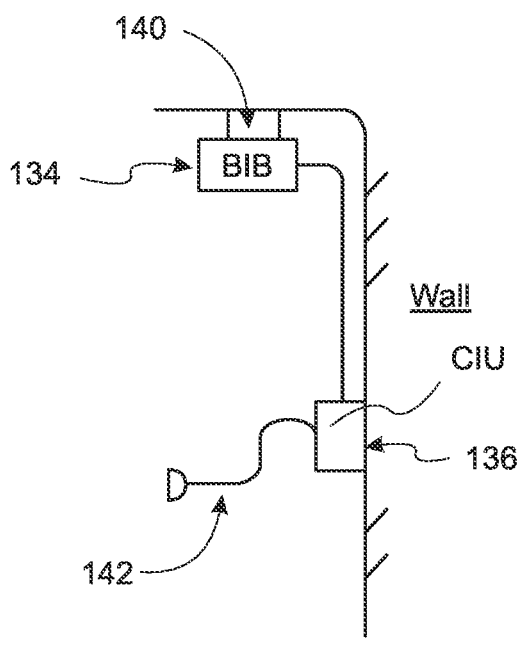
FIG. 6
CBot Docked
at BIB
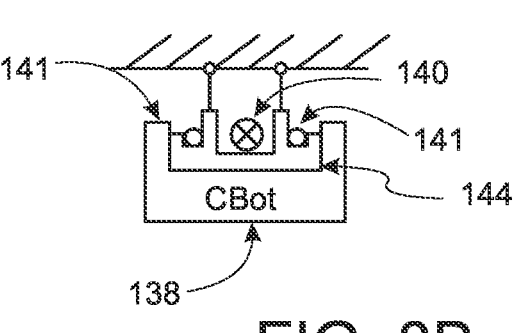
FIG. 7
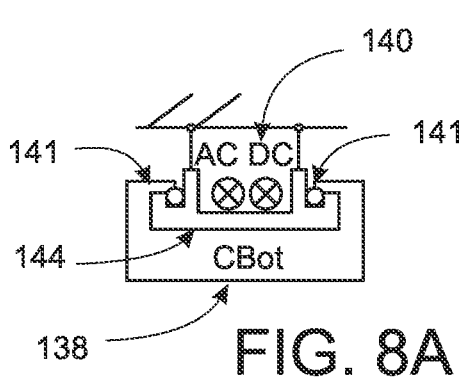
FIG. 8A
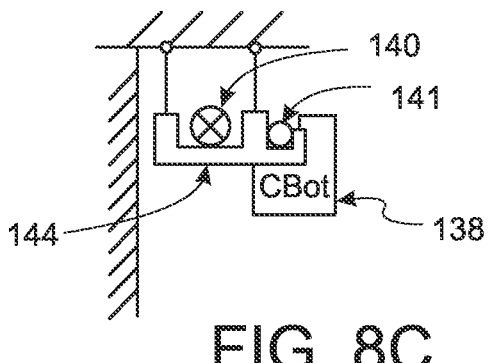
FIG. 8C
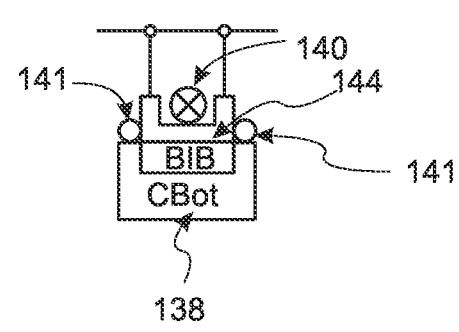
FIG. 8B
FIG. 8D

210

220

VEHICLE TECHNICAL
INFORMATION

222

AVAILABLE CHARGING
OPTIONS

224

PARKING FACILITY
INFORMATION

226

CHARGING TIMING AND/OR
PAYMENT INFORMATION

CHARGING ASSEMBLY WITH CBOT
RAIL AND SPUR SYSTEM

CBOT RAIL/SPUR DOCKING EXAMPLES

EXAMPLE 1

EXAMPLE 2

SINGLE OR
DOUBLE TRACK (SHOWN)

138
324
X
322
326
Y
FIRST
POSITION 138
352
324
322
326
SECOND
POSITION

138
CBot
324
352
350
DCM

310
Charging
Bus
DCM
350
352   324
138
CBot

CHARGING SYSTEM WITH 2 STAGE
DC CHARGING BUS USING CBOTS

DCFC WITH CBOTS

ELECTRIC VEHICLE CHARGING SYSTEM WITH TWO STAGE DC CHARGING

CROSS REFERENCE TO RELATED APPLICATIONS

This Non-Provisional Patent Application is a continuation application of U.S. Ser. No. 18/385,333, filed Oct. 30, 2023, and claims the benefit of the filing date of U.S. Provisional Patent Application Ser. No. 63/420,476, filed Oct. 28, 2022, U.S. Provisional Patent Application Ser. No. 63/423,247, filed Nov. 7, 2022, and U.S. Provisional Patent Application Ser. No. 63/432,866, filed Dec. 15, 2022, all of which are herein incorporated by reference.

TECHNICAL FIELD

The present disclosure relates generally to examples of electric vehicles and to devices for use with an electric vehicle, including electric vehicle batteries and electric vehicle charging systems and devices.

BACKGROUND

Electric vehicles and electric vehicle devices provide quiet, clean, and efficient powertrains for moving from place to place or for getting work done.

For these and other reasons, there is a need for the present invention.

SUMMARY

The present disclosure provides one or more examples of an electric vehicle and systems and/or devices for use with an electric vehicle.

In one example, the present disclosure provides an electric vehicle charging system. The electric vehicle charging system includes charging bus charging robots.

Additional and/or alternative features and aspects of examples of the present technology will become apparent from the following description and the accompanying drawings.

BRIEF DESCRIPTION OF THE DRAWINGS

The Figures generally illustrate one or more examples of an electric vehicle and/or devices for use with an electric vehicle such as electric vehicle batteries or electric vehicle charging systems.

FIG. 6 is a diagram illustrating one example of a charging system.

FIG. 7 is a diagram illustrating one example of a charging system.

FIG. 8A is a diagram illustrating one example of a charging system including a charging bus suspension structure.

FIG. 8B is a diagram illustrating one example of a charging system including a charging bus suspension structure.

FIG. 8C is a diagram illustrating one example of a charging system including a charging bus suspension structure.

FIG. 8D is a diagram illustrating one example of a charging system including a charging bus suspension structure.

DETAILED DESCRIPTION

Figure 1:
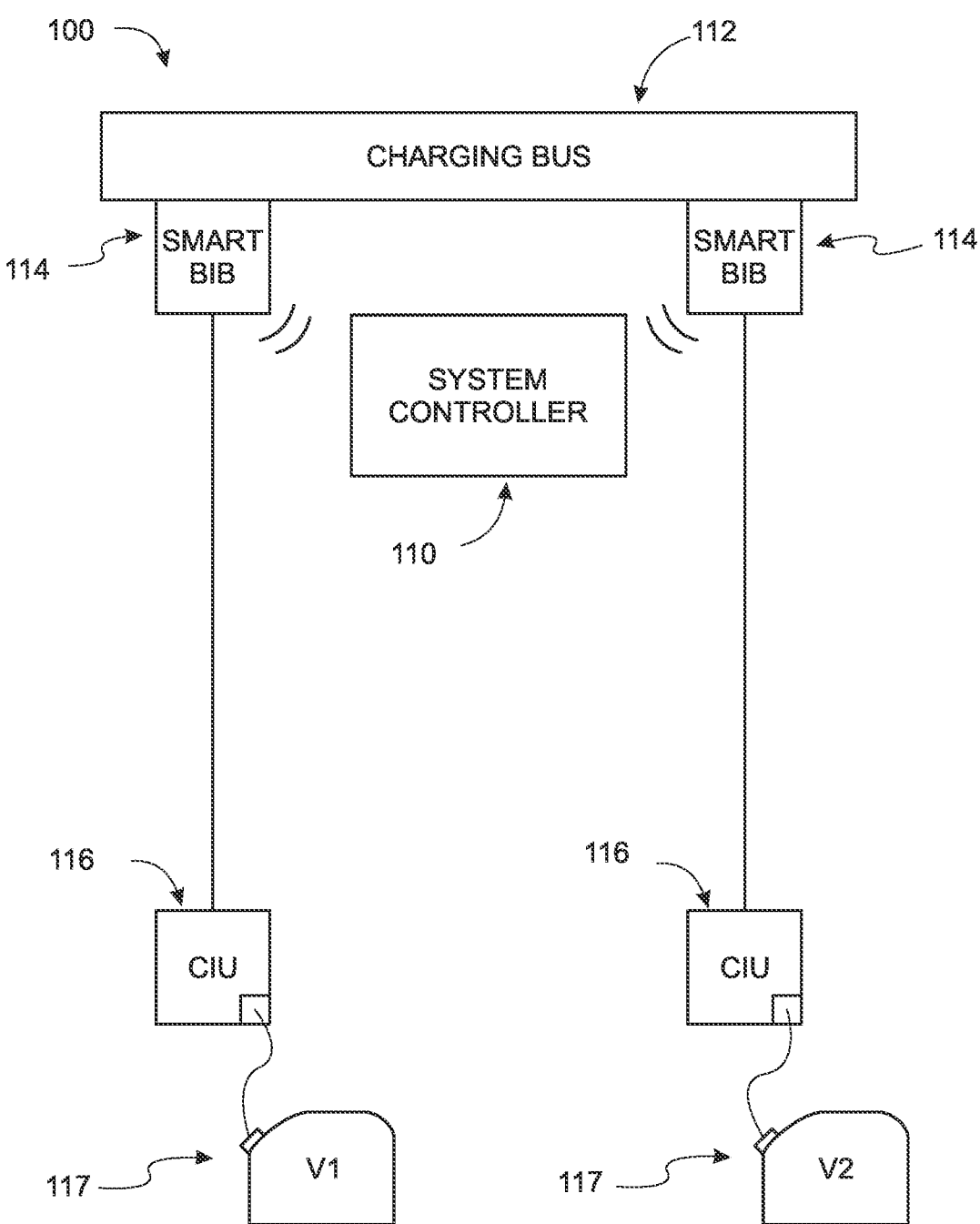
FIG. 1 is a diagram illustrating one example of a charging system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

Electric vehicles (EVs), such as automobiles (e.g., cars and trucks), snowmobiles, personal watercraft (PWC), all-terrain vehicles (ATVs), side-by-side vehicles (SSVs), and electric bikes, for example, offer a quiet, clean, and more environmentally friendly option to gas-powered vehicles. Electric vehicles have electric powertrains which typically include a battery system, one or more electrical motors, each with a corresponding electronic power inverter (sometimes referred to as a motor controller), and various auxiliary systems (e.g., cooling systems).

Charging System Overview

The present disclosure provides an EV charging system for simultaneously charging multiple EVs. One or more examples and features of the charging system are detailed herein and illustrated in the Figures.

EV Charging System with Charging Bot

An EV charging system could be residential or commercial. Could be set in most any parking location. In a commercial version, the EV charging system could be set in a parking lot, parking facility or part of a parking facility. In a residential application, the charging system could be located in a garage or near a house. A charging bot can be used for automatic charging of one or more vehicles located in the facility. A charging control system coordinates charging of one or more vehicles. The control system can communicate with the electric vehicle and/or a user app.

EV Charging System With Power Bus

A commercial EV charging system which may simultaneously charge multiple vehicles includes an EV charging control system and at least an AC Power Bus extending along or across a number of EV parking spaces of a parking facility. In other examples, the EV charging system may include an AC Power Bus and/or a DC Power Bus. The AC Power bus may extend above the parking spaces (e.g., at a front, at a middle, or at a rear of the parking spaces). The parking facility may be a surface parking lot or a parking ramp. The AC Power Bus may have capacity to simultaneously charge multiple EVs. Upon parking, a driver of an EV communicates with the EV charging controller to indicate that the driver wishes to have the EV's battery charged. In one case, the driver may select whether the requested charge is to be via an AC charge or a DC charge (e.g., a fast charge). In some cases, the driver communicates with the DC charging controller via a transceiver, where each parking space has a corresponding transceiver which indicates the EV's location to the EV charging controller. In some cases, the driver communicates via the transceiver using an app installed on an electronic device (e.g., on a smartphone or on a computer system integral to the EV). Such communication may include various data for proper and safe charging of the EV, such as vehicle type (make & model), battery type, available charging options (e.g., AC and DC charging), a current state of charge (SOC) of the battery, charging port/receptacle location on the vehicle, etc., as well as payment information (e.g., credit card information). Additionally, a driver may enter a time by which the driver expects to depart (i.e., a time by which a requested charging operation needs to be complete). Based on the information provided, the EV charging controller may communicate to the driver the expected time by which the charging operation will be completed and the price of the charging operation. If the completion time and/or price of the charging operation is not satisfactory, a driver may cancel the charging operation request. Based on the information of each EV which has requested a charging operation (e.g., the type of charge (AC or DC), the SOC, and the time by which the charge needs to be completed (e.g., the expected departure time of the EV), the EV charging control system determines an order of charging of the EVs to optimize the number of EVs which can be charged in a given period of time. In other examples, the vehicles are simply charged on a first come, first serve basis. The EV charging control system may communicate the expected completion time of the charging time to the driver. The EV charging control system may provide updates to the drivers of the EV via a smartphone application as to the status of the charging operation, either automatically or upon request by the drivers. In some cases, if a driver parks in a "charging zone" and attempts to schedule a battery charging operation, but the charging zone is already at a charging capacity (e.g., the system is unable to charge the vehicle within the requested time window due to the number of cars already scheduled for charging), the EV charging control system may direct the driver to other charging zones within the facility which are able to charge the vehicle within the desired time frame.

Charging robots. The EV charging system may include a number of charging robots (CBots) which are configured to automatically connect to and perform the requested charging operation of the EV. In some cases, each CBot is arranged to carry out one charging operation at a time, where a number of CBots together enable the system to simultaneously carry out multiple charging operations, where the number of simultaneous charging operations able to be performed depends on an electrical capacity of the EV charging system.

In some implementations, the CBots run on a track system which extends along parking spaces of the parking facility. The track system may be wall mounted, ceiling mounted, surface mounted (e.g., on a surface of a parking lot or ramp). In some cases, the electric power bus (e.g., AC and/or DC) may also be employed as part of the track system along which the CBots run. In examples, each CBot may be assigned to a number of parking spaces (a "charging zone") such that each CBot is able to run back-and-forth along a segment of the track/power bus corresponding to its assigned parking spaces. In examples, the CBot includes an on-board rectifier to convert the AC power from the AC power bus to DC power to provide DC fast charging capabilities. In some cases, according to the charging schedule developed by the EV charging control system, the CBot moves along the track to the parking space corresponding to the EV to be charged. Depending on the scheduled charge type, the CBot will either provide an AC or a DC connection to the EV. In some cases, the CBot includes an articulating arm that includes a selectable connector type for connecting to the connector type of the EV to be charged. In some cases, upon reaching the parking space of the EV to be charged, the CBot communicates with the EV to carry out the charging operation. In some examples, such communication includes instructing the EV to open a cover or door to expose the EV's charging port/receptacle. In some cases, the CBot automatically senses and locates the EV charging receptacle and inserts the charging plug into the EV charging receptacle. In some cases, such sensing may be optical. In other cases, a driver of the EV may insert a charging port extender/adapter that provides a receptacle/connector that is compatible with the plug(s) of the CBot (e.g., a adapter that provides an AC and/or DC receptacle compatible with the AC and/or DC plug/connector of the CBot. Upon connecting the charging cable to the EV, the AC or DC power, as required, is provided to the EV from the power bus via the CBot. In examples, power to operate the CBot is derived from the AC power bus. Upon completion of the charging operation, the EV charging control system may notify the owner/driver that the charging operation is complete, the CBot disconnects the power cord/plug/connector from the EV, retracts the articulating arm, and moves along the AC power bus to the required location to perform the next charging operation.

In other cases, the CBots may be autonomous CBOTs (a-CBots), which are free of a track system and which are configured to "drive" to any parking space within the parking facility to perform a scheduled charging operation.

In such a case, the a-CBot may include an onboard battery-powered electric and control system to drive and maneuver the a-CBot to the parking space to which it is directed by the EV charging control system to perform a charging operation. Upon reaching the designated parking space, the a-CBot connects with a first articulating arm to the AC power bus, and connects a charging cord to the charging port of the EV using a second articulating arm (similar to that described above).

In other examples, in lieu of the charging system employing a power bus, the CBots carry an onboard battery for charging the EVs, wherein the onboard battery has a capacity to fully charge at least one vehicle. The CBot/EV charging control system monitors the state of charge (SOC) of the CBot's onboard battery. Upon the SOC of the CBot dropping below a predetermined charge level, the CBot drives to a central battery facility where it automatically exchanges the depleted battery with a fully charged battery (e.g., which is stored on a battery rack system) and returns to scheduled charging of EVs in the charging facility. After placing the depleted battery on the battery rack, the depleted battery is recharged by a charging system located within the central battery facility. In examples, a fleet of CBots operates to charge EVs parked within the parking/charging facility and shares the supply of batteries maintained within the central battery facility. In this fashion, a total number of batteries which is less than double the number of CBots may be employed (e.g., with a fleet of 10 CBots, the central battery facility may maintain a total of 15 batteries, where 10 are mounted to and being used by the CBots at a given time). In examples, the central battery facility may employ DC fast charging to recharge the supply of CBot batteries. Such a charging system does not require power bus(es) to be installed throughout the parking facility and can be employed in any number of types of parking facilities (e.g., parking ramps, surface parking lots, etc.).

In another case the Charging System can include a-CBots with a charging rack. This type of Charging System can include one or more of the following features:

The charging system can include one or more a-cbots.

Each a-CBot can be responsible for charging multiple vehicles over a charging period.

This type of charging system is great for servicing a charging room, floor, partial floor or multiple floor parking facility (i.e., a charging facility).

Each a-CBot has an on-board vehicle charging battery.

The charging facility would have one or more charging locations. For example, there could be one centralized charging location or one or more charging locations dedicated to a charging area.

An a-CBot can have a restore mode where it moves to a charging location and charges its vehicle charging battery at the charging location. The vehicle charging battery can be "quick-charged" or slow charged.

Once charged, the a-CBot transitions to a vehicle charging mode where it moves to a designated vehicle to perform a vehicle charging process.

An a-CBot can move between a restore mode and a vehicle charging mode multiple times over a 24 period, charging multiple vehicles over that time period.

In the vehicle charging mode, a designated vehicle can be slow charged or quick charged depending on a number of vehicle factors.

The a-CBot can run off of the vehicle charging battery or a separate battery. Both batteries can be charged when the a-CBot is in restore mode.

An a-CBot may or may not include an AC/DC converter.

The charging facility can include a battery charging system that includes a charging rack. The charging rack operates to charge and store vehicle charging batteries. A vehicle charging battery is moveable between a charging rack and an a-CBot.

In one case, the a-CBot can move a vehicle charging battery onto a charging rack. In another case, the battery charging rack loads the vehicle charging battery from the a-CBot onto the battery charging rack.

In operation, once a vehicle requests a charge an a-CBot loads a fully charged vehicle charging battery from the rack onto the a-CBot. The a-CBot then moves to the location of the EV making the charge requests and performs a vehicle charge operation.

Once complete, the a-CBot returns to the battery charging rack location and loads the empty battery (i.e., not fully charged) onto the charging rack at an open location on the rack. The a-CBot can then move to another rack location that contains a fully charged battery. The a-CBot then loads the fully charged battery and moves to another electric vehicle location to fill another vehicle charge request.

This system can utilize more a-CBots with fewer batteries. For example, a parking facility could have 10 a-CBots and 15 vehicle charging batteries. Up to 10 vehicle charging batteries could be actively used at a given time, with 5 batteries in reserve being charged on the charging rack.

If there was a given time where a charged vehicle charging battery was not available from the charging rack, the a-CBot could enter a wait mode until it was notified that a charged battery was available for use.

Charging systems using a-CBots with vehicle charging batteries are suitable for many different charging facility applications, including locations where it is not feasible to located power rails, etc within the charging facility.

The CBots can interface directly with the vehicle, or through a separate CBOT interface unit. The CBot interface unit can be plugged into the EV's charging port, and located (e.g., at the front or back of the vehicle) at a position that allows for direct access by the CBot.

The EV charging system may include multiple a-CBots, where a number of CBots together enable the EV charging system to simultaneously carry out multiple charging operations of multiple EVs, where the number of simultaneous charging operations able to be performed depends on an electrical capacity of the EV charging system.

Example EV charging systems with CBot applications include the following applications:

Ev charging station with charging bot (cbot)

Residential charging station with cbot

Parking facility charging station with cbot

Commercial charging station with cbot

Smart cbot

Cbot with battery

Cbot that operates on a floor/flat surface

Cbot that operates along a wall, column system or post system.

Cbot that moves between a floor and wall/post system.

Cbot/ev control system that communicates between the ev/bot/user. The user can communicate via any user interface (e.g., computer, tablet, phone or control pad).

The cbots could also be drone cbots

In examples, in lieu of the CBots including an onboard AC-DC rectifier to enable DC fast charging, the EV charging system includes both an AC bus and a DC bus, where the DC bus is powered via a centralized AC-DC power supply.

In other examples, in lieu of employing CBots, each parking space may have a corresponding power cord which is manually connected to the EV by the driver. Each power location has an assigned address by which the EV charging control system controls the timing and order in which the charging operations of the EVs in the parking facility are charged, wherein the EV charging system individually controls which addressable power cord is activated for charging based on the developed charging schedule.

One Example Garage CBot EV Charging Sequence

The CBot could have one or more of the following features:

CBot senses a vehicle, and then wakes up vehicle charging controls.

CBot could sense vehicle by a number of methods including motion detectors or other sensing method. Once sensed (even if false detection) bot sends out EV wake-up signals.

EV enters garage space/bot wakes up EV charging system/EV activates charging mechanism/charging tray.

CBot leaves CBot rest position/location. CBot could be wired or leave a CBot station. CBot moves to charging position with EV.

In one example, CBot uses charge plug active positioning to get very close to alignment with the charging tray.

Next CBot charge plug secures to charge tray. In one example, a CBot plug is secured to the charge tray using magnetic coupling.

when charging is complete, CBot turns off magnetic coupling to remove it from charging position.

CBot returns to the rest station.

CBot could be used to charge one vehicle or multiple vehicles. Or for example, there could be 2 CBots that charge up to 10 vehicles overnight, etc.

One Example CBot Design

Cbot can include:

Control system that interface with ev and/or ev app

Electric motor

Power System including Battery/may include AC-DC converter

Ev interface arm (that electrically couples to ev)

Power grid interface arm (that electrically couples or aids in coupling to power grid/rail system/etc)

Movement system that allows free or restricted or designated movement of cbot-(wheels, or attachment to frame system)

Cbot could charge at the same time ev is charged or charged at its own charging station. Cbot could be electric but not battery powered.

In a commercial EV charging facility or a ramp charging facility the cbots could run on a mechanical rail system (e.g., located along the walls) and be kept off the parking facility floor.

Charging System with Suspended Bus Overview

The present disclosure provides an EV charging system for simultaneously charging multiple EVs. One or more examples and features of the charging system are detailed herein and illustrated in the Figures.

The EV charging system may be employed in any suitable parking facility, such as parking ramps and surface parking lots, for example, and may be employed both as part of newly constructed parking facilities or adapted for use in existing parking facilities. The parking facility may be most any type of parking facility, such as a public parking facility (e.g., shopping centers), a corporate parking facility (e.g., associated with a business, such as manufacturing facility or a hotel), and a commercial parking facility (e.g., a pay facility)—any type of parking facility where EVs will be parked for extended time periods (e.g., for an hour or more) while the drivers are occupied with other tasks (e.g., shopping, dining, attending a sporting event, working, etc.). In examples, the parking facility may include parking for both EVs and non-electric vehicles.

With the present charging system, a vehicle owner can simply park in a charging space, request a vehicle charge via their vehicle control system or app, plug in their vehicle (e.g., manually or automatically) and walk away from the vehicle. The charging system takes it from there.

FIG. 1 is a diagram illustrating one example of an electric vehicle charging system with a suspended charging bus. The charging system 100 includes a system controller 110, a charging bus 112, one or more bus interface units 114 (i.e., SMART BIBs), and one or more charging interface units 116 (CIUs). The suspended charging bus 112 is distributed across one or more charging spaces. The BIBs 114 are coupled to the charging bus 112. Each CIU 116 is coupled to a BIB 114. In operation, a vehicle needing a battery charge parks in one of the charging spaces, and requests a charge operation via a vehicle graphical interface with a vehicle control unit or a vehicle charging application (e.g., using a phone app, vehicle GUI, tablet or computer). A BIB 114 is coupled to the charging bus 112 at each charging space, and is coupled between the charging bus 112 and a CIU 116. The CIU 116 is manually or automatically (e.g., via a Bot) plugged into the parked vehicle requesting a charge, illustrated at 117. The suspended charging bus 112 delivers power to charge the vehicle via the BIB 114 and the CIU 116. In one application, the charging bus 112 is an AC charging bus. In another application, the charging bus 112 is a DC fast charging bus (e.g., a kazz ultra fast DC fast charging bus). The system controller 110 communicates with the BIB 114 and the CIU 116 to control the transfer of power to charge the vehicle.

Figure 1A:
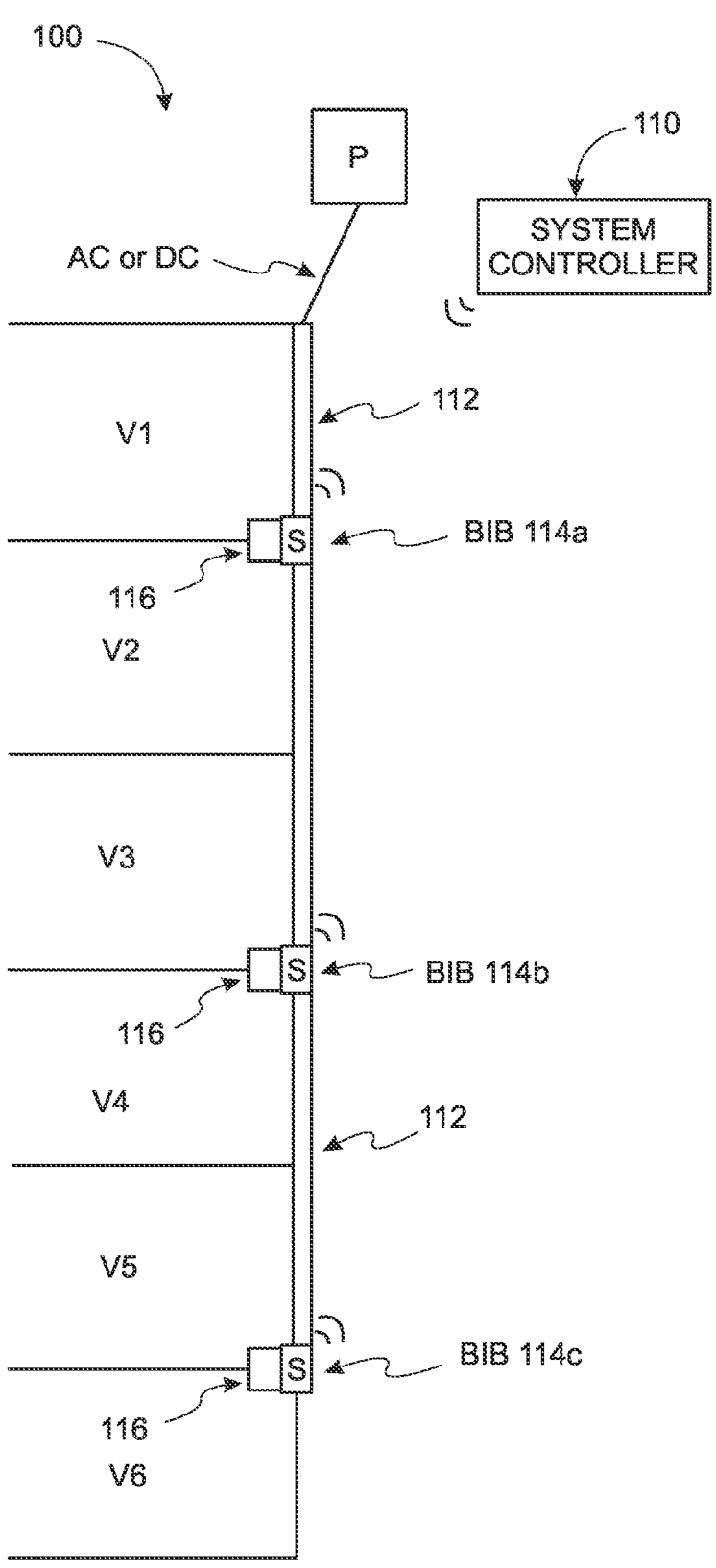
FIG. 1A is a diagram illustrating one example of a charging system.

In one example illustrated in FIG. 1A, charging system 100 is controlled by system controller 110 as part of a load management system. The load management system can be similar to one or more load management systems detailed herein. In one example, multiple BIBs are located in a parking facility for remote control of charging at each charging location. As illustrated, each BIB 114 (indicated as BIB 114*a*, BIB 114*b*, BIB 114*c*) controls charging to one or more vehicles needing a charge (illustrated as V1, V2, V3, V4, V5 and V6). The charging system is a fully addressable system, and includes remote controllable power switches at each BIB for controlling charging power at each BIB location from the charging bus 112. In one example, the power switches S at each BIB are remotely controlled to control charging via a predetermined or desired load management system or scheme/schedule controlled by controller 110. Electric charging to each vehicle requesting a charge can further be controlled via CIUs 116 located near the vehicle (and below the BIBs).

The CIUs 116 and BIBs 114 can both include remotely controllable switching devices. In one example, the remotely controllable switching devices are solid state power semiconductor devices (e.g., as manufactured by and available from Infineon Technologies AG).

Figure 2:
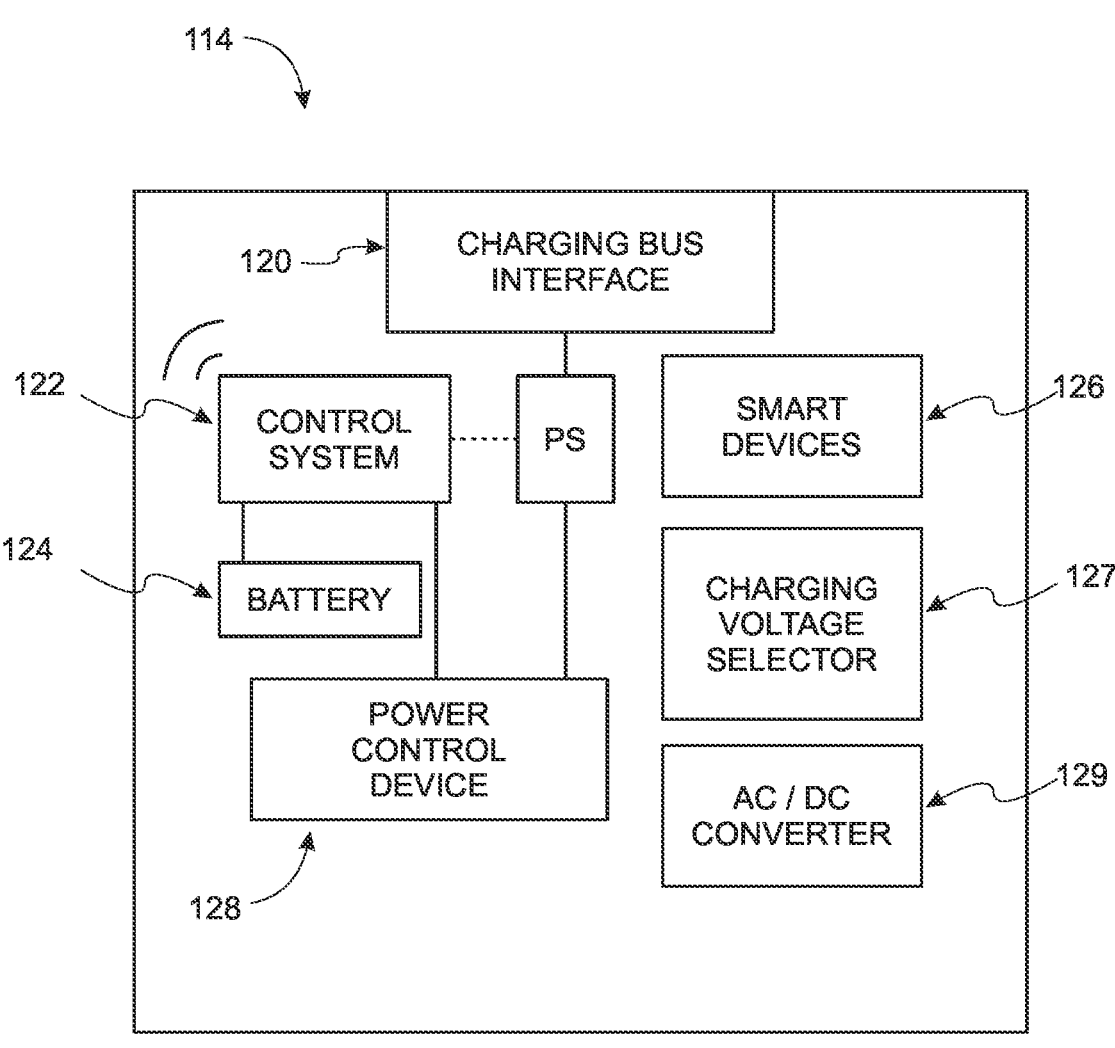
FIG. 2 is a diagram illustrating one example of a bus interface unit.

FIG. 2 illustrates one example of BIB 114 where BIB 114 is a 'smart BIB". BIB 114 includes charging bus interface 120, control system 122, battery 124, smart devices 126, power control device 128. BIB 114 couples to charging bus 112 at charging bus interface 120. The charging bus interface can include panel board devices such as thermal overloads, circuit breakers, etc. Control system 122 includes metering and other smart control devices, and is powered through battery 124.

The BIB 114 is an addressable device that communicates with system controller 110 through BIB control system 122. In one example, the control system 122 provides for active and controlled power control of CIU 116 via a power switch PS and power control device 128. In one example, the power switch PS is located in power control device 128. In other examples, active and controlled power control is handled via CIU 116, which can also include power switching and control devices. Control system 122 is in communication with power control device 128 and power switch PS. In operation, control system 122 communicates with power switch PS to control (e.g., turn on) power delivered to a parking space and power control device 128 to control the amount of power delivered to a desired parking space based on a load management system.

BIB 114 can also include a number of other smart devices, including metering, power control, and power filtering devices. BIB 114 can also include a charging voltage selector 127 that is configured to switch the supply voltage to a desired charge voltage level (e.g., via a voltage divider and/or a transformer). In one example, the charging bus 112 is an AC charging bus. BIB 114 can also include an AC/DC converter 129 for changing (i.e., converting) the BIB 114 output voltage to a DC voltage. In another example, the charging bus 112 is a DC fast charging bus.

Once charging of the vehicle battery pack is completed, the BIB 114 and/or CIU 116 automatically disconnect the charged vehicle from the charging bus 112. In one example, the charged vehicle is electrically disconnected from the charging bus 112. In another example, the charged vehicle is also mechanically disconnected from the charging bus. The vehicle owner is notified via a charging communication, such as an app, that the charging operation is complete.

The charged vehicle charging plug is manually disconnected from the electric vehicle CIU 116. The charging plug can be manually or automatically returned to the CIU 116 for storage at the CIU 116. In one application, the charging plug is automatically disconnected from the charged vehicle. In one example, the charging plug is electromagnetically coupled to the charged vehicle. Once charging is complete, the charging plug is automatically released from the vehicle (e.g., by releasing the electromagnetic coupling). The charging cord and plug 142 are automatically retracted into the CIU 116 for storage and protection until another vehicle is positioned in the charging space and requests a charge.

The system controller 110, BIBs 114, CIUs 116, and other components of the charging system 100 are in communication with one another (as well as with EVs) using any suitable communication technique including hardwired communication and wireless communication (e.g., Bluetooth, BLE, cellular, radio, etc.).

The charging system 100 with a suspended charging bus 112 can be used in new and existing charging facilities. The charging system 100 is highly suitable for retrofitting existing parking facilities to include electric vehicle charging spaces. The charging system 100 is very flexible and can include a small number of charging spaces, many charging spaces, and/or dedicated charging ramp levels or floors.

Figure 3:
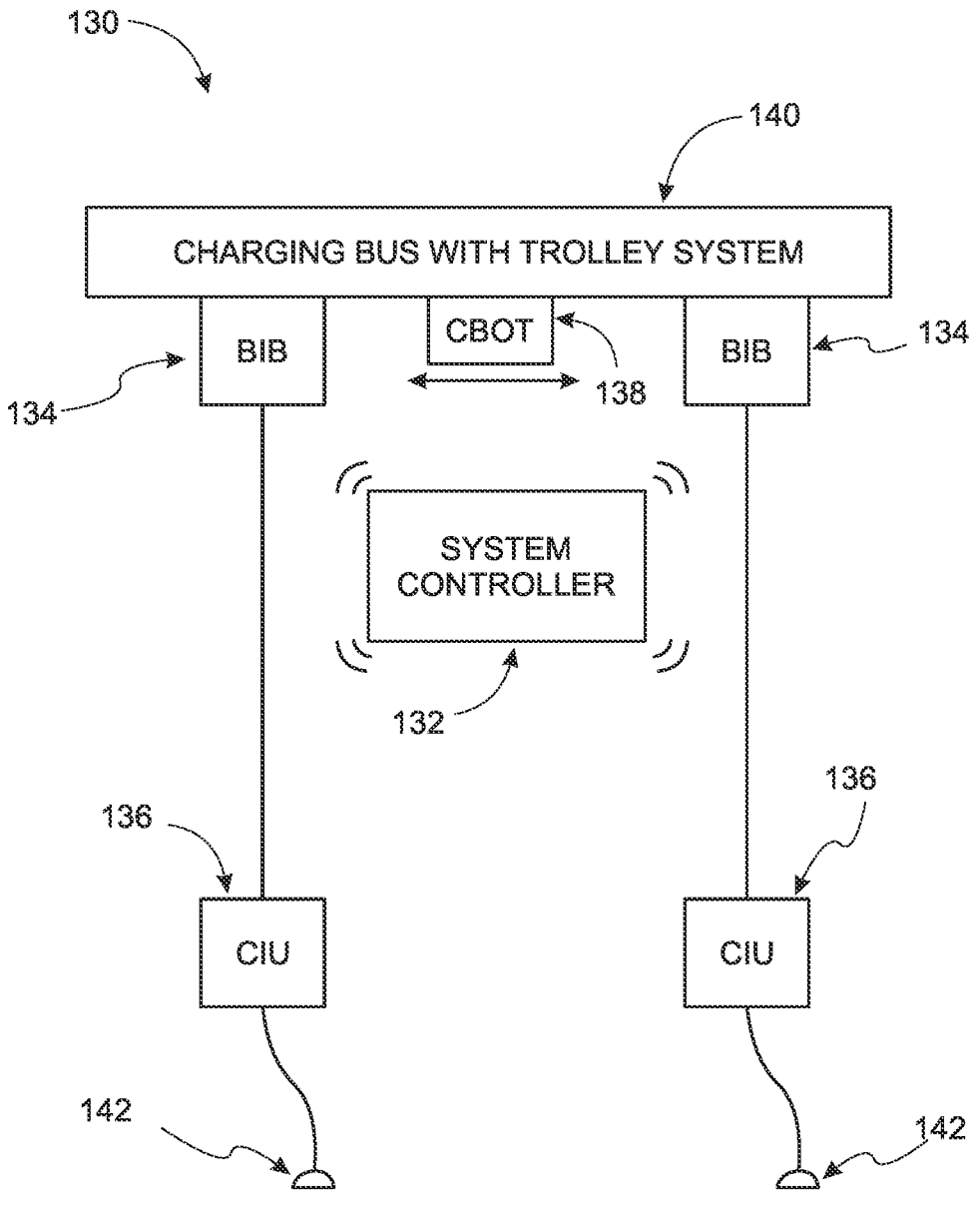
FIG. 3 is a diagram illustrating one example of a charging system.

FIG. 3 illustrates another example of a charging system generally at 130. The charging system 130 is similar to charging system 100 previously detailed herein. In one application, the charging system 130 includes a system controller (SC) 132, one or more bus interface boxes (BIBs) 134, one or more charging interface units (CIUs) 136, and one or more charging robots (CBots)138. The charging system 130 further includes a suspended charging bus 140. The suspended charging bus 140 is distributed across one or more charging spaces. A charging robot transport system (e.g., a trolley or rail system) is provided for moving the CBot 138 along the power charging bus 140. In one example illustrated, the suspended charging bus and the CBot transport system are part of the same (i.e., a common) suspended structure.

In operation, a vehicle needing a battery charge parks in one of the charging spaces, and requests a charge operation via a vehicle graphical interface with a vehicle control unit or a vehicle charging application. A BIB 134 is coupled to the charging bus 140 at each charging space, and is coupled between the charging bus 140 and a CIU 136. The CIU 136 is plugged using charging cord 142 into the parked vehicle requesting a charge. The suspended charging bus 140 delivers power to charge the vehicle via the BIB 134 and the CIU 136. The system controller 132 communicates with the BIB 134 and the CIU 136 to control the transfer of power to charge the vehicle. In one example, each BIB 134 and/or CIU 136 are addressable and smart systems such that the system controller 132 can selectively control the transfer of power to charge the vehicle. In one example, the system controller 132 selectively controls the transfer of power to the vehicle via each BIB and CIU as part of a load management system.

Figure 3A:
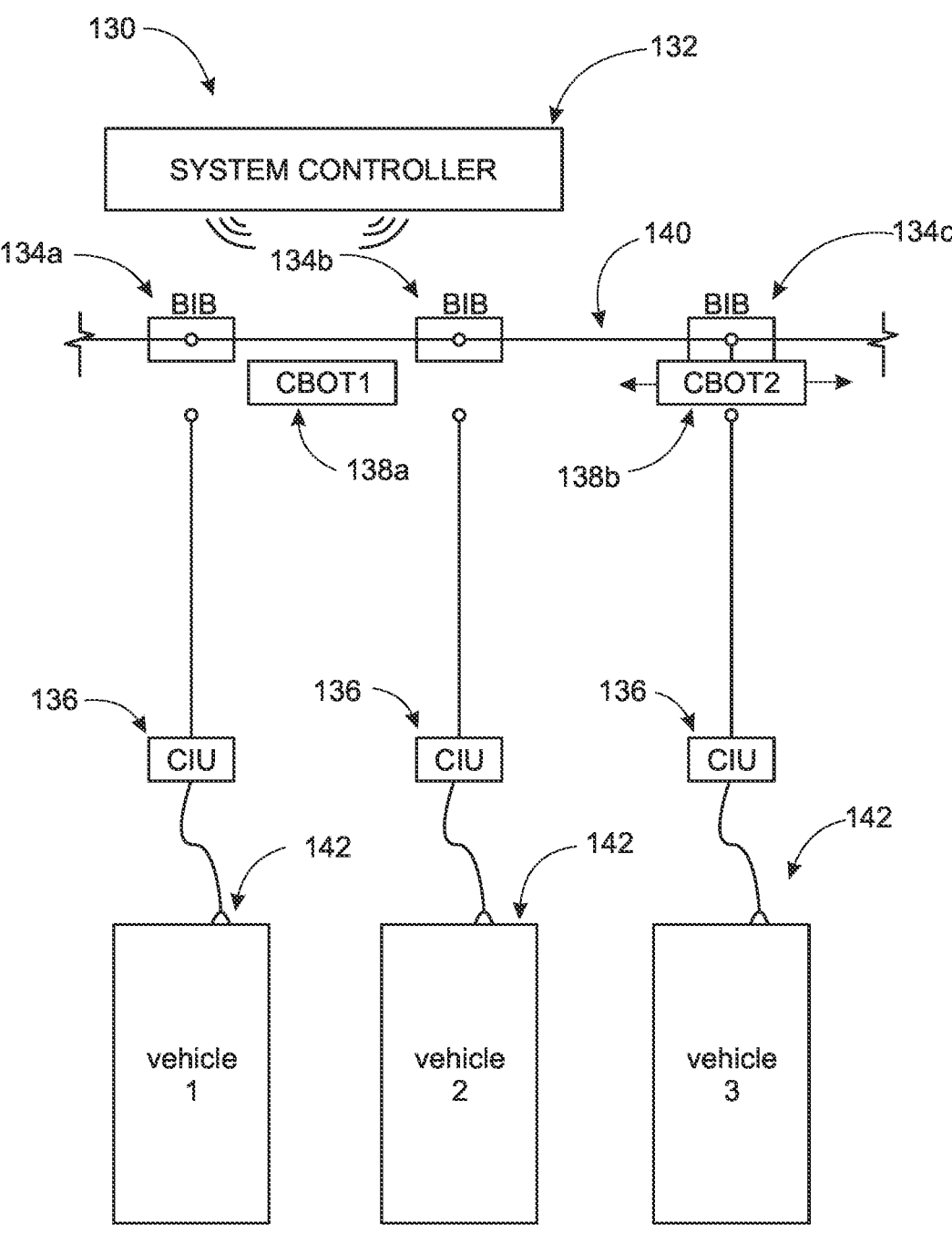
FIG. 3A is a diagram illustrating one example of a charging system.

Reference is also made to FIG. 3A. In one application, the charging bus 140 is an AC charging bus. A CBot 138 (e.g., CBot 138a or 138b) moves along the charging bus 140 using the CBot trolley system to the BIB 134 at the location requesting a charge and docks at the BIB location. The CBot 138 aids in performing the charging of the vehicle. For example, the CBot 138 can perform bus switching functions, power flow, metering, billing and other functions. In one example, the CBot 138 is a dedicated DC charging CBot, and includes an AC to DC converter. In one example, the CBot 138 aids in providing DC fast charging to the vehicle. In another example, the charging bus 140 is a DC charging bus.

Once charging of the vehicle battery pack is completed (e.g., at vehicle 1), the BIB 134, CBot 138, and/or CIU 136 automatically disconnect the charged vehicle from the charging bus 140. The vehicle owner is notified via a charging communication, such as an app, that the charging operation is complete.

The CIU 136 charging plug 142 is manually disconnected from the charged vehicle. In one application, the charging plug 142 is automatically disconnected from the charged vehicle. In one example, the charging plug 142 is electromagnetically coupled to the charged vehicle. Once charging is complete, the charging plug 142 is automatically released from the vehicle (e.g., by releasing the electromagnetic coupling). The charging cord and plug are automatically retracted into the CIU for storage and protection until another vehicle is positioned in the charging space and requests a charge.

The system controller 132, BIBs 134, CIUs 136, CBots 138 and other components of the charging system 130 are in communication with one another (as well as with EVs) using any suitable communication technique including hardwired communication and wireless communication (e.g., Bluetooth, BLE, cellular, radio, etc.).

The charging system 130 with a suspended power charging bus 140 can be used in new and existing charging facilities. The charging system 130 is highly suitable for retrofitting existing parking facilities to include electric vehicle charging spaces. The charging system 130 is very flexible and can include a small number of charging spaces, many charging spaces, dedicated charging levels.

Charging System Components

The following paragraphs describe one or more examples of components of a charging system with a suspended power bus.

System Controller

Figure 4:
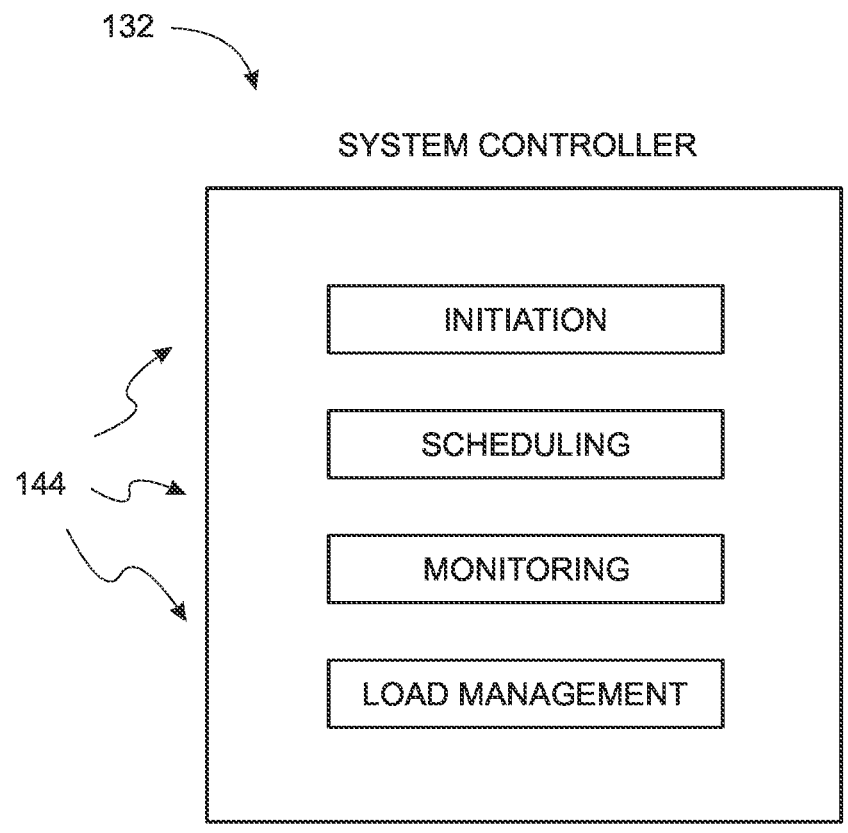
FIG. 4 is a diagram illustrating one example of a system controller.

The system controller 132 coordinates operation of the vehicle charging system. In one example illustrated in FIG. 4, these tasks 144 include initiation, scheduling, monitoring, and load management of vehicle charging operations. The system controller 132 is in communication with some or all of the components of the charging system 130. One or more examples of operation of the charging system 130 including the system controller 132 are detailed in this specification.

Suspended Power Charging Bus with CBot Trolley System

Figure 5:
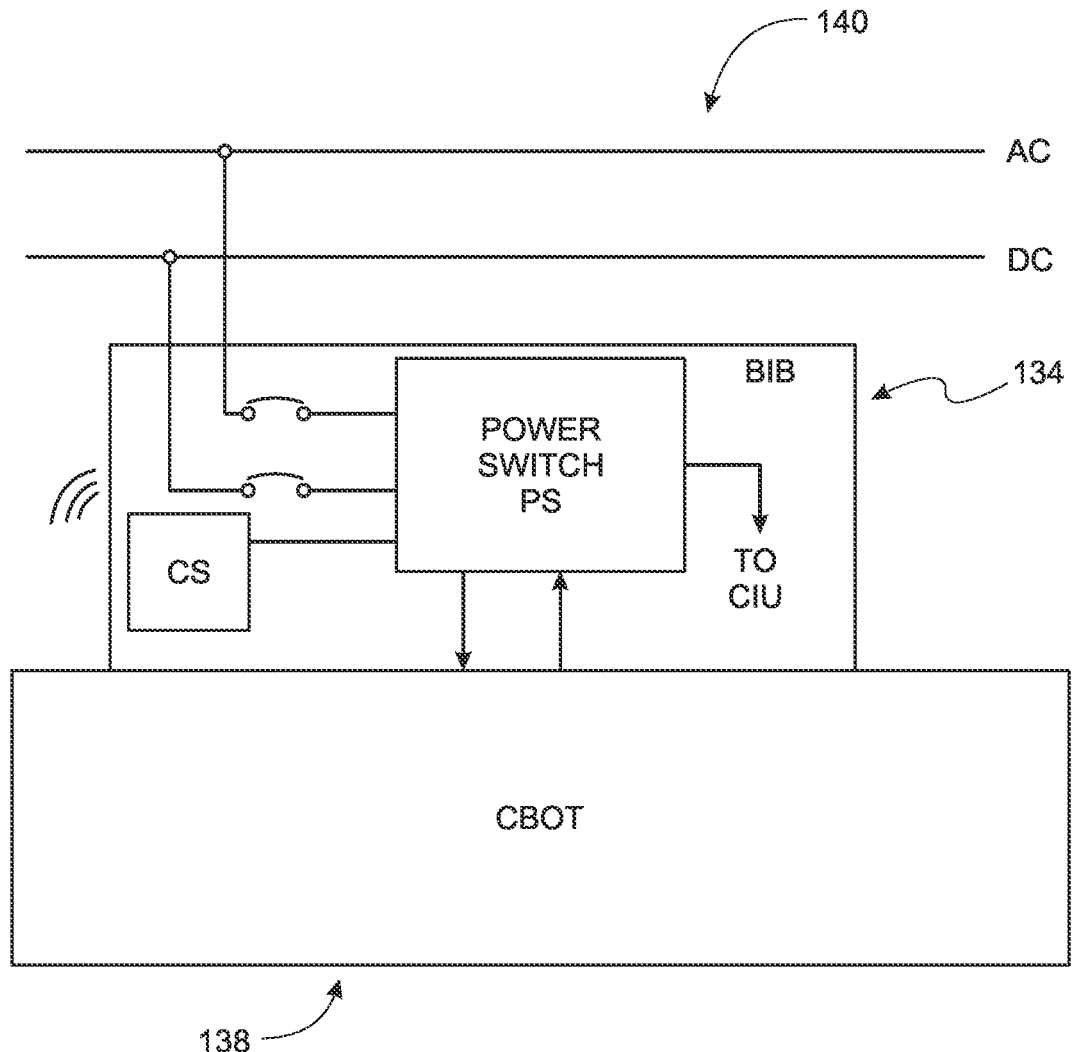
FIG. 5 is a diagram illustrating one example of a charging system.

FIG. 5 illustrates one example of a suspended charging bus with CBot Trolley System. The suspended charging bus 140 extends across one or more charging spaces at a charging facility. In one example, the bus 140 is located within a protected suspension structure (e.g., a jacketed cable within a conduit, cable tray or other structure). The suspension structure can be coupled to a facility ceiling, structural members, and/or wall. In one example, both the charging bus 140 and CBot trolley system 141 are part of the same suspension structure 144.

In one example, BIB 134 is a smart BIB coupled to both the AC and DC power bus. The BIB 134 power switch 134 is coupled to both the AC power bus and DC power bus, and can select the AC bus or DC bus for AC or DC fast charging. In one example, the power switch PS includes two power switches. CBot 138 receives the AC or DC power feed from BIB 134 and couples it with a CIU.

FIG. 6 and FIG. 7 illustrate examples of a BIB coupled to a suspended charging bus. In FIG. 6 the BIB 134 is coupled to the suspended charging bus 140. Power is controlled (e.g., switched) to a CIU located local to a charging space via power switches located within each BIB. In FIG. 7, a CBot 138 aids in controlling power between charging bus 140 and a CIU 136 located near a vehicle requesting a charge.

In one example, the CBot trolley system 141 is part of the suspension structure 144. In one example, suspension structure 144 supports charging bus 140 and trolley system 141. FIGS. 8A, 8B, 8C, and 8D illustrate examples of charging bus 140 and trolley system 141 suspended from a common suspension structure 144. Additionally, CBot 138 is located on the trolley system. FIG. 8A illustrates one example including an AC and DC charging bus (e.g., as illustrated by the bus cables) 140 supported on top of suspension structure 144. Cbot 138 including trolley system 141 is supported below suspension structure 144. FIG. 8B illustrates one example including an AC or DC charging bus (e.g., as illustrated by the bus cable) 140 supported on top of suspension structure 144. Cbot 138 including trolley system 141 is supported below suspension structure 144. FIG. 8C illustrates one example including an AC or DC charging bus (e.g., as illustrated by the bus cable) 140 supported on top of suspension structure 144. Cbot 138 including trolley system 141 is supported on one side of suspension structure 144 (e.g., a side away from a wall 145). FIG. 8D illustrates one example including an AC or DC charging bus (e.g., as illustrated by the bus cable) 140 supported on top of suspension structure 144. Cbot 138 including trolley system 141 is supported below suspension structure 144, and is illustrated docked at a BIB 134.

In one or more examples, the trolley system 141 moves along the bottom or side of the suspension structure 144. The trolley system 141 allows a CBot 138 to move along the charging bus 140 to access a vehicle requesting a charge. A BIB 134 is coupled to the charging bus 140 at each charging location. The trolley system 141 allows a CBot 138 to move along the charging bus 140 and couple to (i.e. dock at) a BIB at desired charging locations. In one example, a CBOt 138 mechanically and electrically docks with a BIB 134. Alternatively, the trolley system 141 can be a rail system.

The charging bus 140 receives its power from an upstream utility feed, disconnect, power panel, or other electrical system feed.

In one application the charging bus 140 is an AC power bus. In another application, the charging bus 140 is a DC power bus. In another application, the charging bus 140 includes an AC and a DC power bus, where the DC power bus is used for fast charging of electric vehicles. In one case, the AC and DC power buses extend across a number of charging spaces. Then the DC power bus continues on to solely extend across a number of charging spaces that are dedicated to DC fast charging of electric vehicles.

In another example, the power charging bus 140 is an AC bus extending across multiple charging spaces. In some examples, the AC bus terminates at an AC to DC converter, with a fast charging DC power bus then extending therefrom across a number of charging spaces beyond the converter. These charging spaces can be dedicated to DC fast charging of vehicles.

In another example, the suspended charging bus 140 is an AC bus extending across multiple charging spaces. DC fast charging CBots couple to the charging bus at a desired charging location BIB (i.e., dock at) to provide DC fast charging to a vehicle if DC fast charging is requested by the vehicle.

The suspended charging bus 140 can be mounted from an overhead support structure, or may be wall mounted at a height off of a charging area floor.

Bus Interface Box

A BIB 134 is located along the charging bus 140 at each charging location. A BIB 134 can be dedicated to a single charging space or multiple charging spaces. In one application, a BIB 134 is located near (e.g., in between) two charging spaces for serving two charging spaces.

Figure 9:
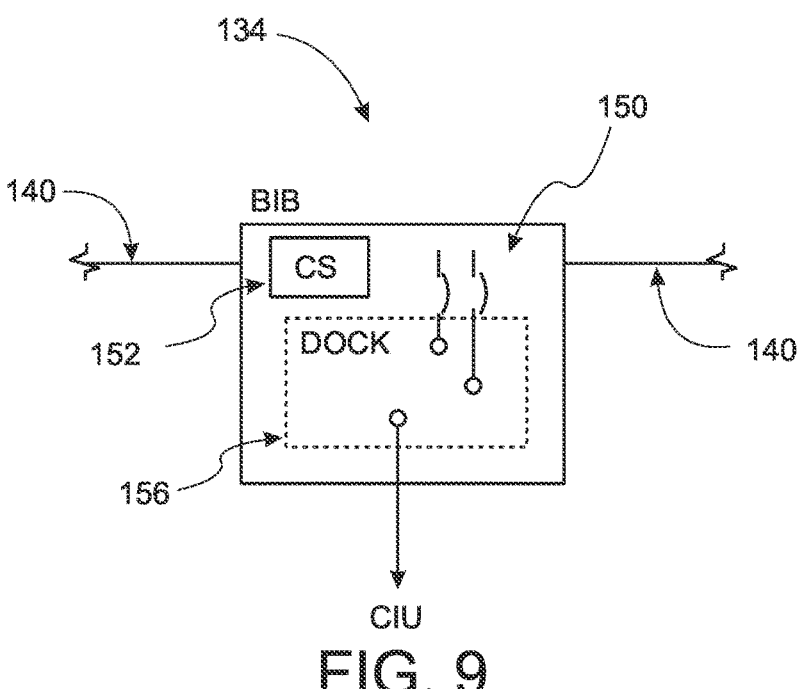
FIG. 9 is a diagram illustrating one example of a charging system bus interface unit.

Reference is also made to FIG. 9. A BIB 134 has multiple functions. A BIB 134 serves to connect a charging location, for example a CIU 136, to the suspended charging bus 140. Since the charging service connection taps off of the main power bus extending across multiple charging spaces or locations, the BIB 134 can include one or more overload devices and may also include a disconnect switch 150. The BIB can be an addressable BIB and include a control system 152 for communicating with the system controller 132. The BIB is coupled to the suspension structure. The BIB is mechanically and electrically connected to the charging bus 140. Additionally, the BIB operably connects to one or more CBots 138 for controlling power supplied through the BIB 134. In use, the CBot 138 moves along the charging bus 140 using the CBot trolley system. Each BIB 134 provides a CBot docking system 156. The docking system 156 allows a CBot to move past the BIB charging location, or dock at the BIB charging location to aid in charging a vehicle parked at that location.

Charging Robot(s)

Figure 10:
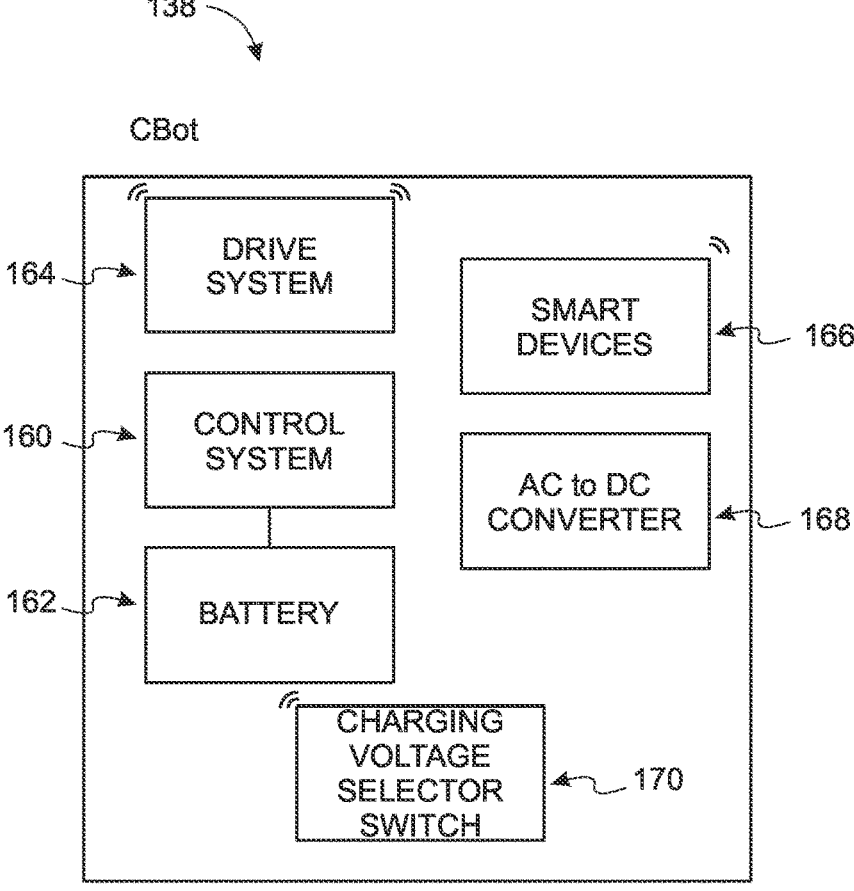
FIG. 10 is a diagram illustrating one example of a charging system charging robot.

One or more CBots 138 aid in charging operations performed by the charging system 130. In one example illustrated in FIG. 10, each CBot 138 can include a control system 160 for communicating with the system controller or other devices, a battery 162 and electric motor/drive system 164 for moving along the charging bus 140 using the trolley system 141, and other charging components and smart devices 166 such as control devices for controlling charging power flow, metering devices and tracking for billing purposes. In one example, the CBot 138 includes a charging voltage selector switch 170 for changing the output voltage of the CBot to the charging voltage. In one example, the selector switch 170 is controlled via communication with system controller 132.

In one example, the CBot 138 includes an AC to DC converter 168. In one application, the CBot 138 is used as a dedicated DC fast charging bot. If a DC fast charging operation is requested by a vehicle, the CBot 138 moves along the charging bus and docks at the BIB located at the requested charging space. The CBot 138 then aids in DC fast charging using the CBot on-board AC to DC converter 168.

In one application it is recognized that the DC fast charging CBot 138 can charge at any designed rate. In one or more examples, The DC fast charging CBot 138 has the ability to charge a vehicle at a rate faster than charging directly from the AC charging bus. The DC fast charging rate may not be the fastest DC charging rate available, but rather charged at a rate faster than AC charging from the same system (e.g., instead of being able to transfer at a rate of 150 KW, may transfer at a rate of 200-350 KW). In one case, the DC fast charging CBot transfers power at a rate faster than Level 2 AC charging.

The CBot 138 communicates with the system controller 132 and can be used as part of a load management system for coordinating the charging of vehicles based on electrical load characteristics such as time of day, number of vehicles requesting a charge, type of charge, etc.

Charging Interface Unit

Figure 11:
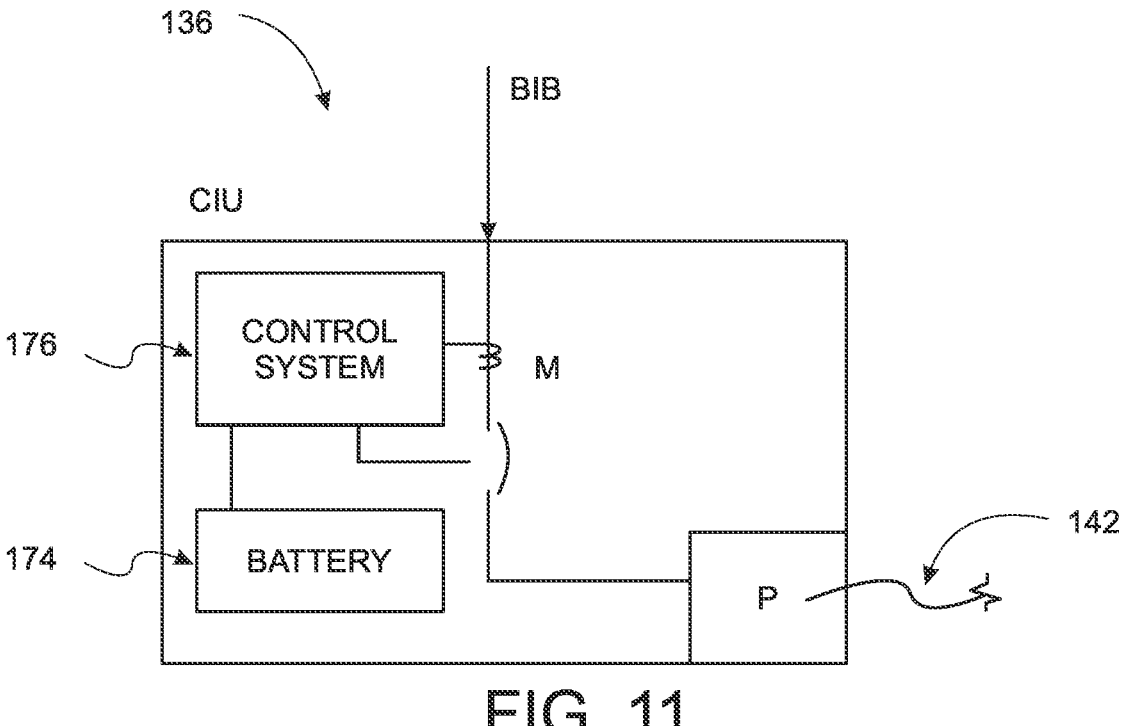
FIG. 11 is a diagram illustrating one example of a charging system charging interface unit.

A CIU is located between each BIB location along a charging bus and one or more charging spaces. In one example illustrated in FIG. 11, the CIU 136 is a smart CIU (e.g., an addressable, controllable unit) and includes an on-board battery 174 and control system 176. The CIU 136 may also allow the charging vehicle to be electrically and mechanically disconnected from the charging system or charging bus. In one application, the CIU 136 is wall mounted near the charging spaces and is configured to serve one or more charging spaces. The CIU 136 is electrically coupled (e.g., via a power cable) to the power bus 140, and in one example is coupled to a BIB located along the power bus. The CIU 136 includes a power charging cord and plug 142 extending from the CIU housing for coupling (i.e., plugging in) to an electric vehicle waiting to be charged.

In one example, a charging plug 142 can be automatically disconnected from the vehicle after charging is complete. The CIU 136 is configured to automatically retrieve (e.g., retract) and roll-up the charging cord and plug to a location within the CIU housing at changing plug port P.

In another example, the CIU 136 is a simple charging plug, portable unit, or outlet box unit. It is a simple device that allows a vehicle to plug into a charging bus. The CIU 136 can be a simple charging plug outlet that can also operate to retract and roll-up a charging cord and plug. The CIU 136 can also operate as a universal charging port, and be configured to coordinate with a number of different charging plugs for charging of different vehicle charging port configurations (e.g., AC charging, DC charging, electromagnetic, other country standard configurations, etc.).

Example System Operation

System Controller/Scheduler

Upon entering the parking facility, the driver of an EV communicates with the system controller to request/schedule a battery charging operation. In one case, the driver may communicate with the system controller via an application installed on a computing device, such as a smartphone or an onboard computing device of the EV. In another case, the driver may communicate with the system controller via a scheduling station, where one or more scheduling stations may be located throughout the parking facility. Such communication may include any number of various scheduling data to enable proper and safe charging of the EV and enable the system controller to determine a charging schedule for charging operations that enables the greatest number of EVs to be charged within a given time period.

Figure 12:
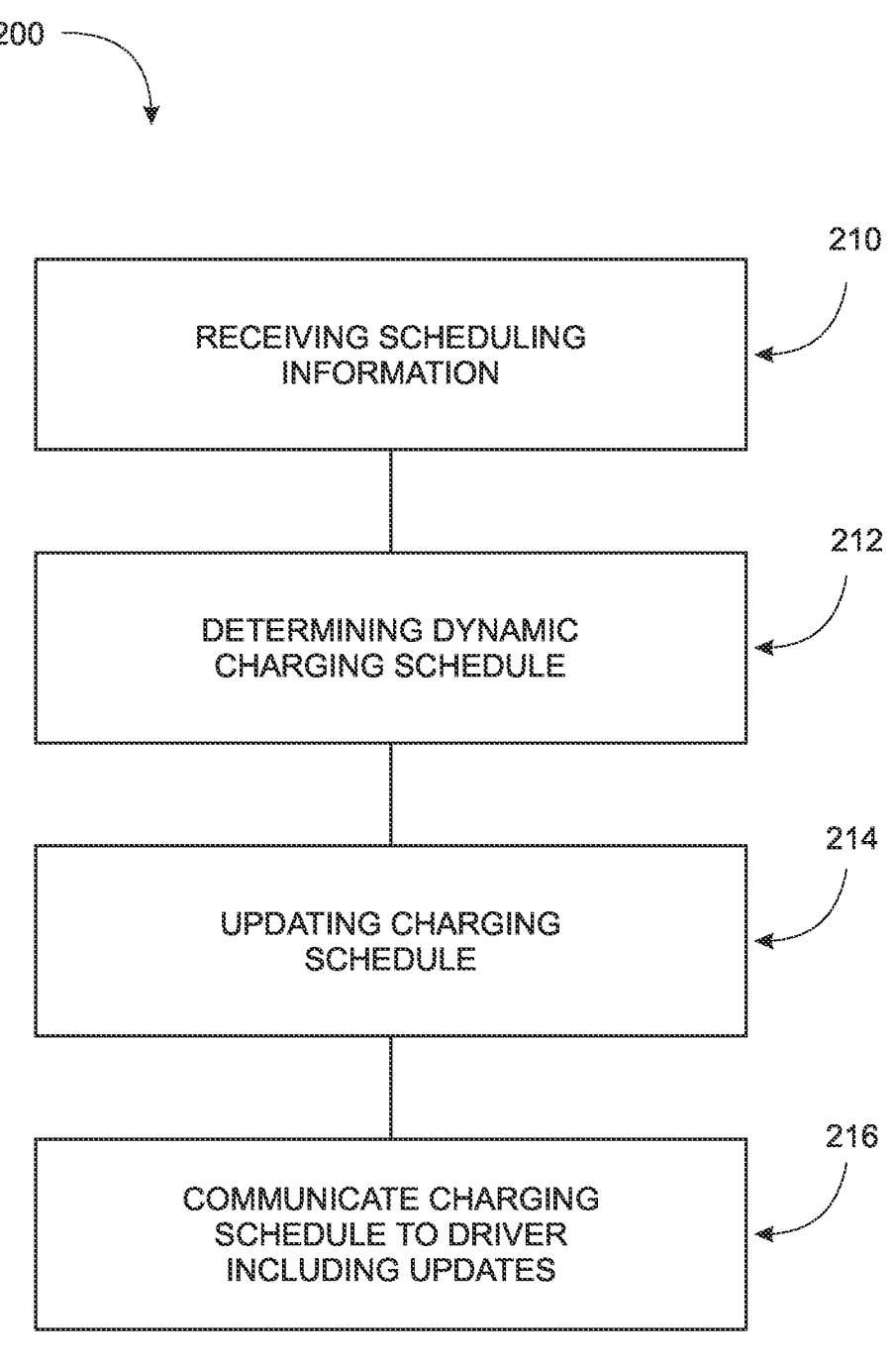
FIG. 12 is a diagram illustrating one example of a dynamic charging method.

FIG. 12 is a diagram illustrating one example of system controller 132 scheduling a charge. At 210, schedule information is received. At 212, a dynamic charging schedule is determined. At 214, the charging schedule is updated. At 216, the charging schedule is communicated to the driver, including updates.

Figure 13:
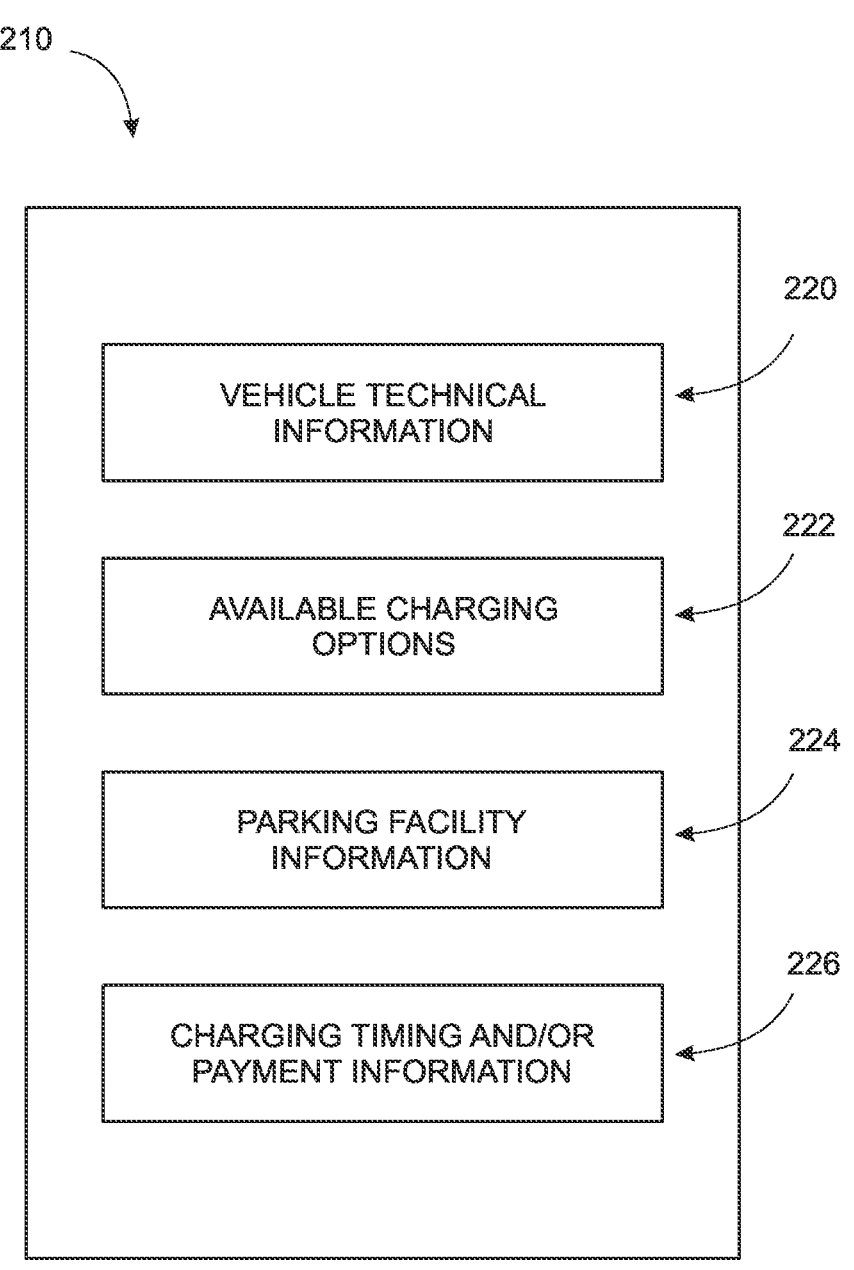
FIG. 13 is a diagram illustrating one example of scheduling information used in a dynamic charging method.

FIG. 13 illustrates one or more examples of scheduling information 210. Scheduling information 210 can include vehicle technical information 220, available charging options 222, parking facility information 224, and/or charging timing and/or payment information 226.

In some cases, such scheduling information may include technical information, such as vehicle type (e.g., vehicle make & model), battery type, available charging options (e.g., Level 1, Level 2, DC fast charging), a current state of charge (SoC) of the EV battery, charging port type/configuration, and additional information, such as a location of the EV in the parking facility (e.g., a parking space number), a license plate of the EV, a time by which the driver needs to the have the charging operation completed, driver payment information (e.g., credit card information), and driver contact information (e.g., smartphone number, email address), for example.

In examples, based on such information, the system controller determines a dynamically adjustable charging schedule for the EVs within the facility which have currently confirmed a battery charging operation. In examples, based on the information provided by the driver, and based on the current charging schedule, the system controller determines an adjusted charging schedule and communicates to the driver the expected time by which the requested charging operation will be completed and the price of the charging operation. In some examples, if more than one type of charging operation is available for the EV, in addition to the requested type of charging operation (e.g., a Level 2 charging operation), the system controller may also communicate a price and an expected completion time of an alternate charging operation type (e.g., a DC fast charging operation).

If the expected completion time and/or price of the requested (or alternate) charging operation is not satisfactory, the driver may cancel the requested charging operation and the current charging schedule is not adjusted by the system controller. In some examples, if a charging operation is not scheduled, the system controller charges the driver a fee for parking in the parking facility based on a rate schedule. If the driver accepts the charging operation (either the requested charging operation or an alternate charging operation), the system controller updates/replaces the current charging schedule with the adjusted charging schedule and provides confirmation of the estimated completion time and the price of the accepted charging operation to the driver. In some examples, the system controller may communicate status updates to the driver (e.g., scheduled times and schedule updates/adjustments, expected completion time of the charging operation, and charging operation completion, etc.).

By employing a dynamically adjustable charging schedule 200, the EV charging system in accordance with the present disclosure is able to charge a maximum number of EVs in a given time period while meeting the completion time of the charging operation as designated by the EV drivers. Furthermore, the EV charging system enables drivers to charge their EVs at times where the EV will otherwise be idle (e.g., while performing other activities such as working, shopping, attending a sporting event, etc.).

Suspended Charging Bus with Both Power Rail and CBot Trolley Transport System In one or more examples, the power rail suspension structure and CBot Trolley Transport System are part of a common support and suspension struction. This allows the CBots to move alongside the charging bus to access charging spaces.

The suspended charging bus includes both the power charging bus and a CBot transport rail (i.e., CBot Trolley Transport System). This easily allows the disclosed charging system to be used as a retrofit system in an existing parking facility or parking garage. In one case, the suspended charging bus includes an AC and/or DC power charging bus that is suspended over one or more parking charging spaces (e.g., 10 parking spaces). The CBot transport system is also suspended and travels along the power bus. A charging interface unit can be located at each charging space. A control system coordinates charging of a vehicle located within one of the charging spaces by moving the CBot to the desired charging space and connecting to the CIU for charging a vehicle located at the charging space.

Figure 14:
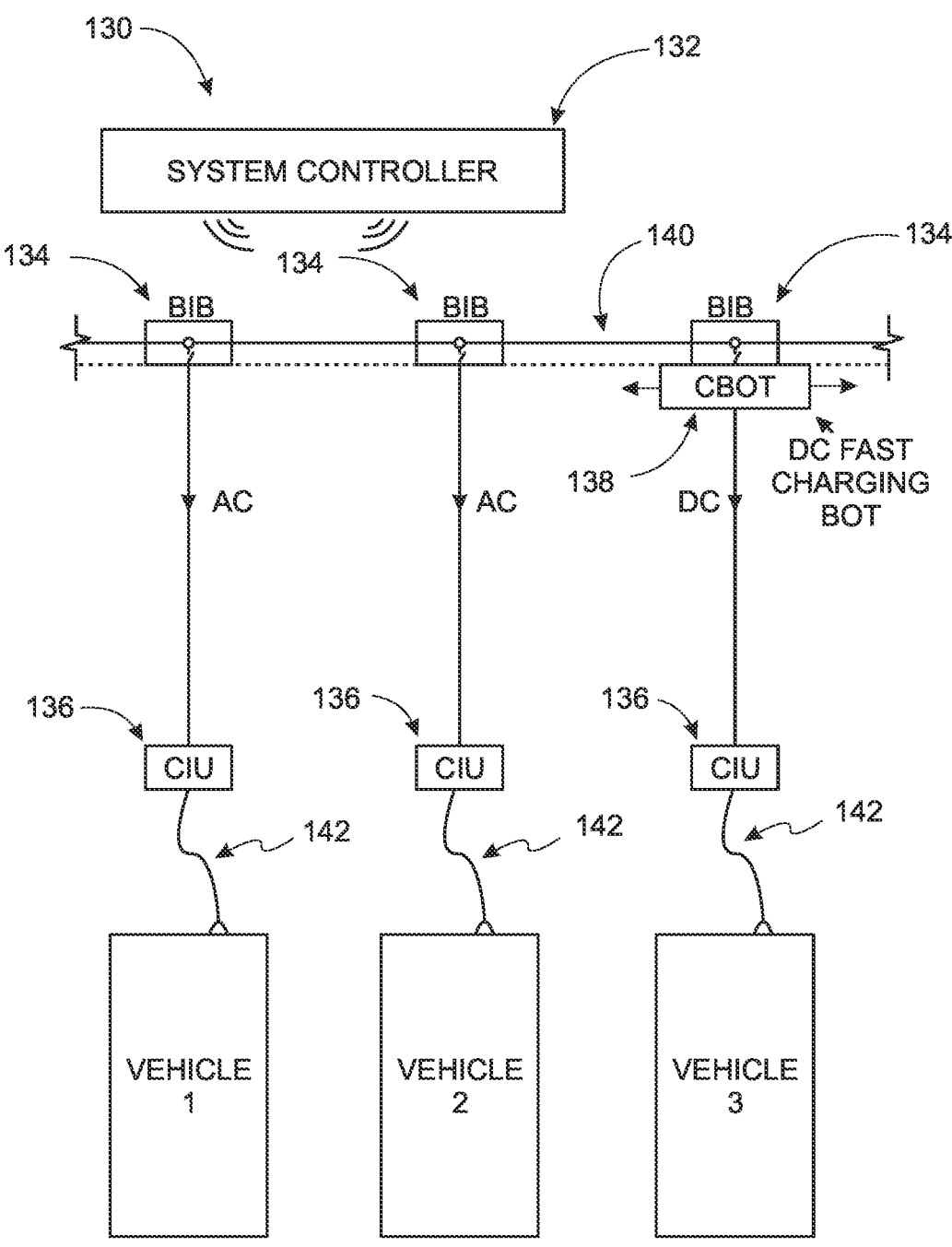
FIG. 14 is a diagram illustrating one example of a charging system.

Examples of Charging System configurations and operation using one or more components of the present disclosure are summarized in the following paragraphs. See also corresponding FIGS. 1, 3, 3A and/or FIG. 14.

Suspended Charging Bus with Multiple CBots. AC or DC Charging Bus

Multiple CBots are coordinated to operate along the charging bus. The suspended charging bus can include an AC charging bus and a DC charging bus. In another example, the suspended charging bus can be an AC charging bus or a DC charging bus. In one example, the suspended charging bus could be located along 20 charging spaces. A first CBot could be conducting a charging operation at charging space 5, and a second CBot could be conducting a charging operation at charging space 12. The control system coordinates both location and load management based on the charging vehicle requirements, charging system capacity and CBot locations.

Example 2. Suspended Charging Bus with Multiple CBots. AC or DC Charging

Multiple Cbots are coordinated to operate along a suspended charging bus. The suspended charging bus is located along multiple charging spaces such as 20 charging spaces. The suspended charging bus can include an AC charging bus and a DC charging bus. In another example, the suspended charging bus can be an AC charging bus or a DC charging bus. In one example, a first CBot is conducting a charging operation at charging space 10. A second CBot is located at charging space 1 and is in a charge waiting mode. A vehicle moves into charging space 18 and requests a charge. In one case, the first CBot stops charging at charging space 10 and moves to charging space 18 and begins charging at that new location. The second Cbot moves to charging space 10 and finishes the charging operation of the vehicle located at charging space 10. The control system coordinates bot location and load management based on the charging vehicle requirements, charging system capacity and CBot locations.

Example 3. Suspended Charging Bus. AC or DC Charging

The charging bus includes an AC charging bus and a DC charging bus. Alternatively, it could be a level 2 AC charging bus and a DC FAST charging bus. Vehicles waiting to be charged can request AC charging or DC charging. The control system provides load management between the charging buses, and vehicles requesting charges in the charging spaces. The control system can manage the switching of charging buses via the BIBs, without the use of CBots. See, for example, FIG. 5. In another case, the CBOTs move to a charging location, and couple the appropriate charging bus to a local charging space CIU based on the requested charge (e.g., slow AC, AC Level 2, or DC fast charging).

Example 4. Suspended Charging Bus. AC Charging Bus. CBot DC Fast Charging

One or more charging bots (CBots) are coordinated to operate along the charging bus. The CBots are dedicated to aid in providing DC vehicle charging, and more specifically, DC fast charging when requested by a vehicle. In one application, the charging bus is an AC charging bus. Under normal operation, a vehicle located in a charging space requests a charge. An interface device such as a BIB located at the charging space operates to connect the vehicle to the AC charging bus (e.g., via a CIU). The vehicle is charged via the AC charging bus. In one example, the charging bus is a Level 2 AC charging bus. If DC fast charging is requested by a vehicle at one of the charging spaces, a CBot moves to that charging space. The CBot operably docks at a BIB at that location, and couples to the CIU located at the charging space. Each DC fast charging CBot includes a converter for converting the AC charging bus supply voltage to DC supply voltage for DC fast charging of the vehicle. See, for example, FIG. 14.

In one application it is recognized that the DC fast charging CBot can charge at any designed rate. In one or more examples, The DC fast charging CBot has the ability to charge a vehicle at a rate faster than charging directly from the AC charging bus. The DC fast charging rate may not be the fastest DC charging rate available, but rather charged at a rate faster than AC charging from the same system (e.g., instead of being able to transfer at a rate of 100 KW, may transfer at a rate of 150-350 KW). In one case, the DC fast charging CBot transfers power at a rate faster than Level 2 AC charging.

Figure 15:
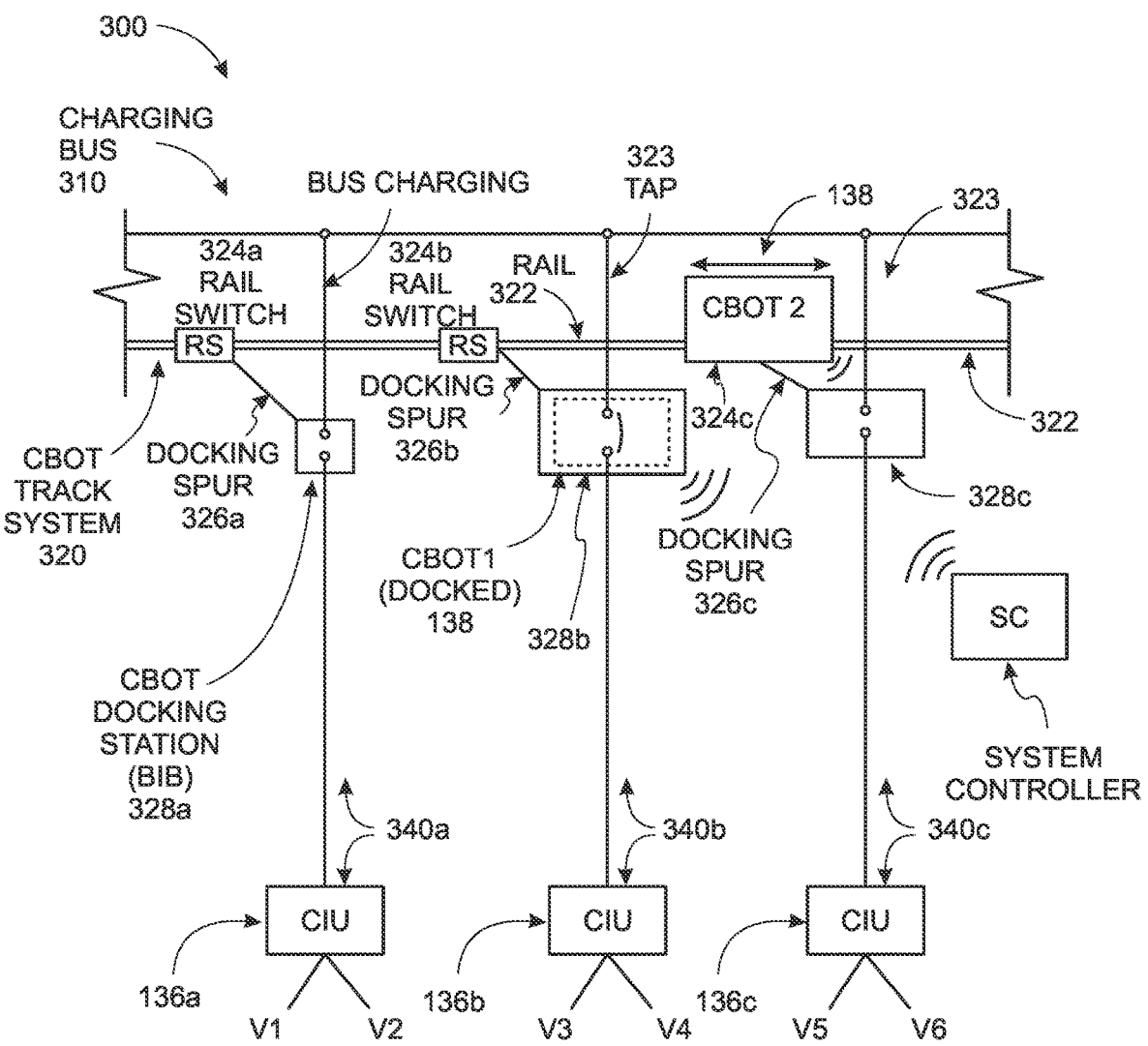
FIG. 15 is a diagram illustrating one example of a charging system including a charging bus.

FIG. 15 is a diagram illustrating one example of a charging system 300. The charging system is similar to the charging systems previously described herein, and includes a charging bus 310 and a CBot track system 320. The CBot track system 320 is configured to allow multiple CBots 138 to operate (i.e., move freely) on a single track system.

In one example, the CBot track system 320 includes a rail and spur system. The CBot track runs alongside (e.g., near, adjacent or in the same area) the charging bus 310 and is configured as a rail and a spur system. The rail and spur system allows one or more CBots 138 to freely move between vehicle charging locations along a CBot rail 322.

In one example, the CBot track system 320 includes a CBot rail 322. For each charging location on each power drop 323 from the charging bus, the CBot track system 320 includes a CBot rail switch, a CBot docking spur, and a CBot docking station (e.g., at a BIB). The docking spur mechanically and functionally couples each docking station to the CBot rail. Once a CBot is docked at a corresponding docking station, the CBot can selectively electrically couple a charging location to the charging bus.

As illustrated in FIG. 15, charging location 340*a* includes a rail switch 324*a*, a docking spur 326*a*, and a docking station 328*a* at BIB 330*a*. Charging location 340*b* includes a rail switch 324*b*, a docking spur 326*b*, and a docking station 328*b* at BIB 330*b*. Charging location 340*c* includes a rail switch 324*c*, a docking spur 326*c*, and a docking station 328*c* at BIB 330*c*. In one example operation illustrated, at rail switch 324*b* CBot 1 moves from the CBot rail 322 to a docked position at docking station 328*b* via docking spur 326*b*. CBot 1 is now in position to aid in charging a vehicle requesting a charge at charging location 340*b*. Since CBot 1 moves to docking station 328*b*, CBot 2 is able to move freely along CBot rail 322. In one example, CBot 2 can move from a location near rail switch 324*a* to rail switch 324*c* to aid in performing a charging operation at charging location 340*c* without interfering with a charging operation being performed by CBot 1 docked at charging location 340*b*.

Figure 16:
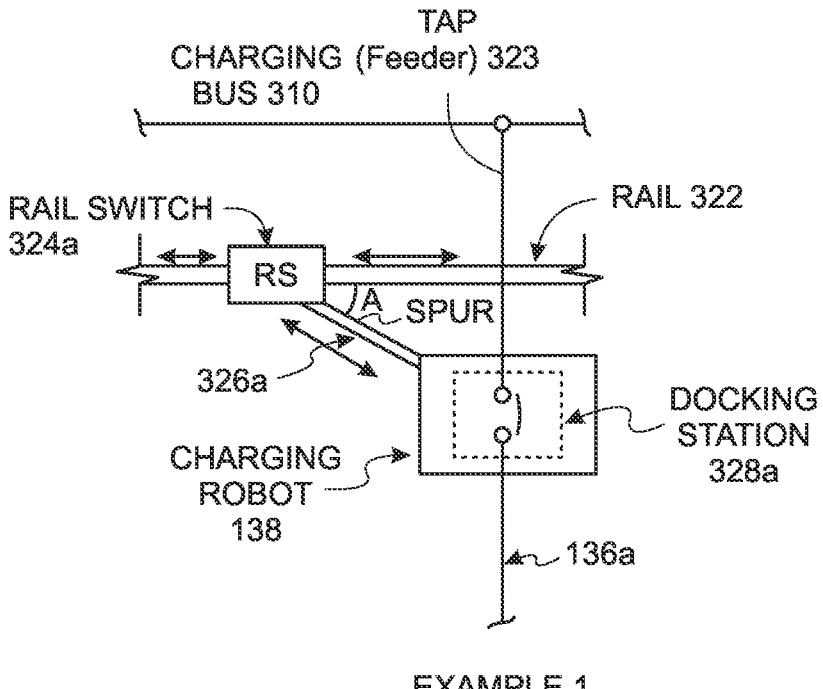
FIG. 16 is a diagram illustrating one example of a charging system rail and spur system.

FIG. 16 is a diagram illustrating one example of a charging system rail and spur system. docking spur 326*a* extends at an angle A (i.e., angled less than 90 degrees relative to rail 322) directly between rail switch 324*a* is located on rail 322. Rail switch 324*a* can be a mechanically operable switch, magnetically operable switch, or electro-mechanically operable switch (e.g., via a power semiconductor switch) to move CBot 1 from a first position on rail 322 to a second position on docking station 328*a*. Once CBot 1 moves from the first rail position to the second docked position, rail switch 324*a* can again operate to allow other CBots (e.g., CBot 2) to freely move along the rail 322 between desired charging locations.

Figure 17:
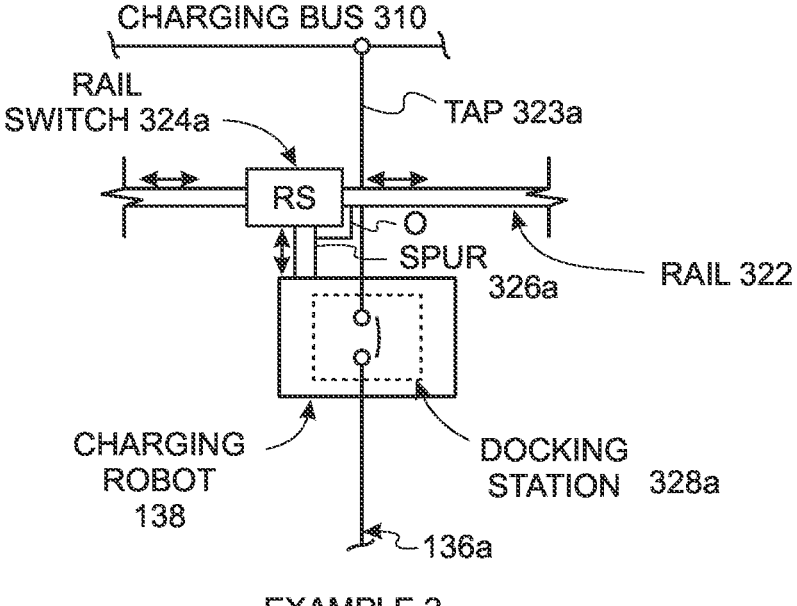
FIG. 17 is a diagram illustrating another example of a charging system rail and spur system.

FIG. 17 is a diagram illustrating another example of a charging system rail and spur system. docking spur 326*a* extends directly between rail switch 324*a* is located on rail 322. In one example, spur 326*a* extends generally orthogonal to rail 322 (an angle of approximately 90 degrees indicated at O). In one example, spur 326*a* extends generally orthogonal to charging bus 310. In one example, spur 326*a* extends generally parallel to charging bus tap 323*a*. Rail switch 324*a* can be a mechanically operable switch, magnetically operable switch, or electromechanically operable switch (e.g., via a power semiconductor switch) to move CBot 1 from a first position on rail 322 to a second position on docking station 328*a*. Once CBot 1 moves from the first rail position to the second docked position, rail switch 324*a* can again operate to allow other CBots (e.g., CBot 2) to freely move along the rail 322 between desired charging locations.

The CBot track system 320 allows multiple CBots to freely move along the CBot charging rail. If a charge is requested, a CBot can leave the CBot charging rail and move to the required docking station via a docking spur. The CBot moves using the CBot transport system and is capable of leaving the rail for a docking spur at a rail switch. In one example, the CBot can exit the CBot rail and move diagonally from the CBot rail to a desired CBot docking station using a docking spur. In another example, the CBot can exit the CBot rail and move perpendicular from the CBot rail to a desired CBot docking station using a docking spur. Once a CBot leaves the CBot rail and docks at a desired docking station to aid in performing a vehicle charging request, other CBots are able to continue to move freely along the CBot rail system without interfering with the CBot performing a charging function. After the charging request is complete, the CBot can remain in wait mode at the docking station or return to the CBot rail until needed for another vehicle charge request.

Figures 17A, 17B:
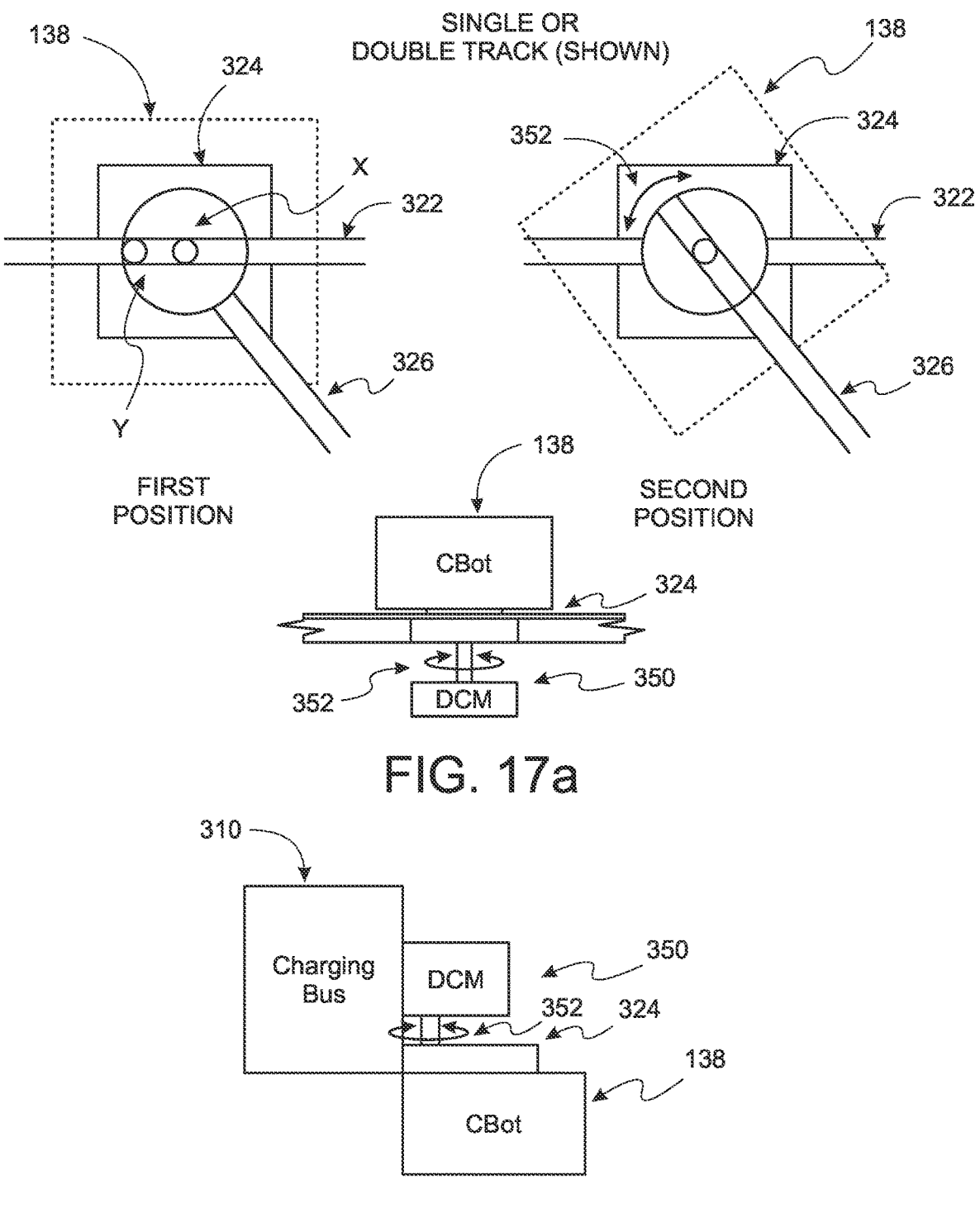
FIG. 17a is a diagram illustrating one example of a rail switch.
FIG. 17b is a diagram illustrating another example of a rail switch.

FIG. 17*a* is a diagram illustrating one example of a rail switch 324. The rail switch 324 is positioned along charging rail 322, for switching CBot 138 between rail 322 and spur 326. The rail switch 324 includes a switch mechanism 348 that is movable or rotable. In one example, the switch mechanism 348 is rotatable about a center axis X. In another example, the switch mechanism 348 is movable about an end axis Y. In one or more examples, the switch mechanism is moved or rotated using a DC motor, illustrated as DCM 350. Axis arrows 252 illustrate movement of the switch mechanism 348. In one example illustrated, the DCM 350 is located below the rail 322.

In one example, the switch mechanism is moveable between a first position and a second position for moving a CBOT to a docking station. In the first position, the switch mechanism 348 is in alignment with CBot rail 322. In a second position, the switch mechanism 348 is in alignment with spur 326.

In operation, a charge is requested at a charging location associated with the rail switch 324. A CBot moves to the rail switch 324 switch mechanism 348 and parks at that location. The switch mechanism 348 is activated and moves the switch mechanism from the first position to the second position. The CBot is now aligned with the spur 326 and can move to a docking location to aid in charging an electric vehicle. FIG. 17*b* is a diagram illustrating another example of a rail switch 324, where the DCM 350 is located above the rail switch 324. In this configuration, the CBOT transport system and charging bus 310 can be located on a common support structure.

Figure 18:
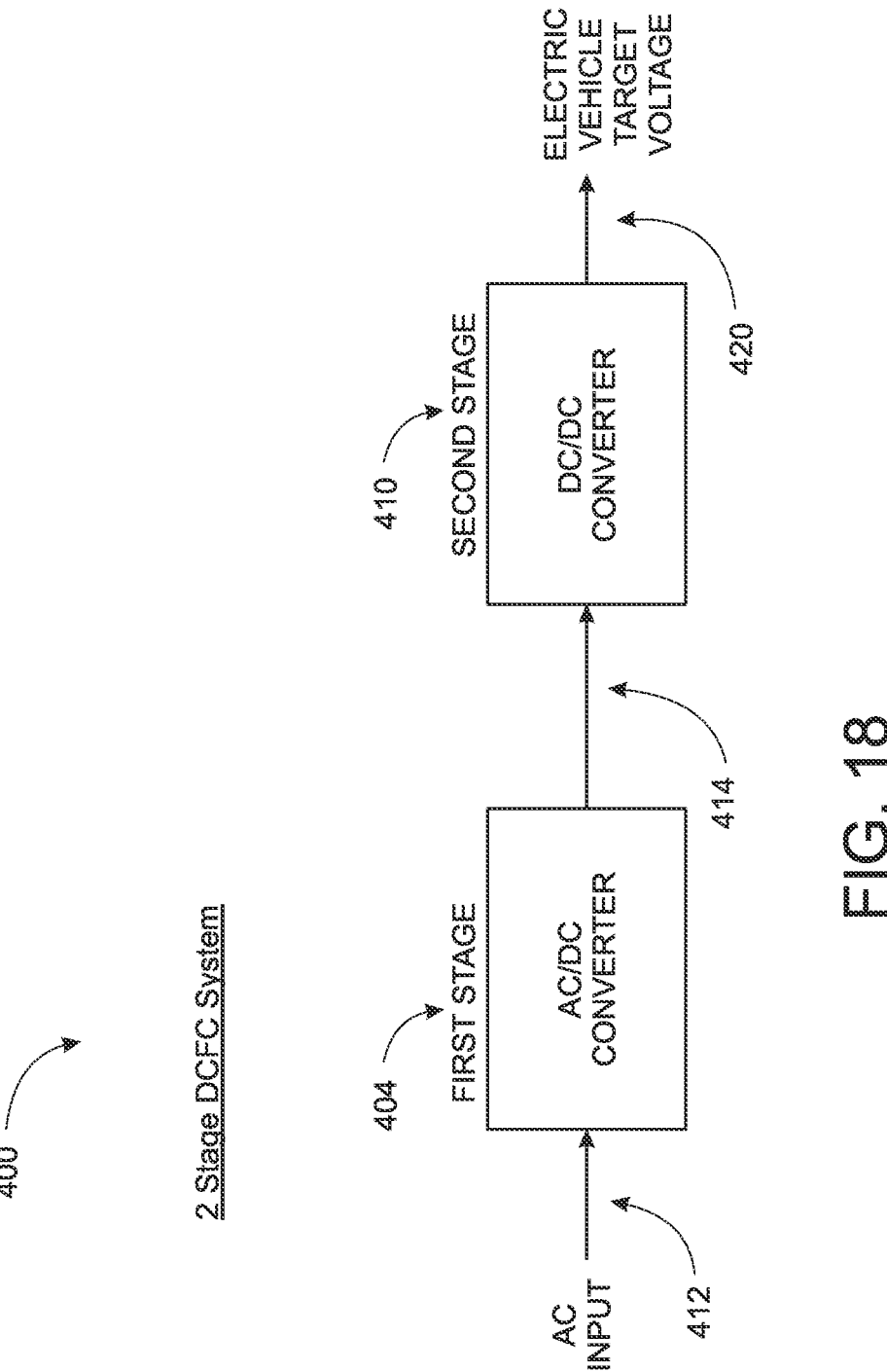
FIG. 18 is a block diagram illustrating one example of a two stage DC charging system.

In one or more applications, the electric vehicle charging system includes a two stage DC charging system, illustrated generally at 400. FIG. 18 is a block diagram illustrating one example of a two stage DC charging system suitable for use with the present application.

The two stage DC charging system includes a first stage 404 having an AC to DC converter, and a second stage 410 having a DC to DC converter. In operation, an AC voltage 412 is input to the first stage 404. The first stage 400 converts the AC input voltage to an intermediate DC voltage level 414. The intermediate DC voltage level 414 is input to the second stage 410 DC to DC converter. The second stage 410 DC to DC converter receives the intermediate DC voltage level 414 and converts it to the desired electric vehicle target voltage 420. In one example, the electric vehicle charging system 400 with a two stage DC charging system is utilized in a DC fast charging (DCFC) system.

AC Input Voltage. The AC input voltage 412 can be an AC input voltage from an AC power grid or it can be an input from an AC charging bus. The AC input voltage 412 from an AC power grid can be 3 phase, 2 phase or single phase. Example US voltage levels are 2400V, 480 volts, 240 volts or 120 v. Example AC charging bus voltages are 480, 440, 240 or 220 volts.

First Stage. The first stage 404 includes an AC to DC converter that converts AC bus voltage to an intermediate DC voltage. Example intermediate voltage levels include 800V DC to 1300V DC. The first stage 404 may also include other circuitry, including power factor correction (PFC). In one example, PFC is accomplished using rectifier/inverter topology. Typical first stage circuitry can include a 3 phase converter that interfaces with the AC power grid. The circuitry may include isolated gate drivers.

Second Stage. The second stage 410 includes a DC to DC converter that converts an intermediate DC voltage 414 (output from the first stage 404) to a desired EV target voltage 420. The second stage 410 can include isolation circuitry that protects users from high voltage circuitry. Common second stage 410 topology includes LLC and phase-shift full bridge converters. The second stage 410 is designed to maximize power density, reduce costs and reduce size. Technology used can be semiconductor MOS-FETs/IGBTs or silicon carbide (SIC) FETs. In one or more applications, the target voltage 420 is a DCFC power output that ranges from 50 KW to more than 400 KW. Example EV target voltages range from 220V to 600V DC.

Charging System Examples

Figure 19:
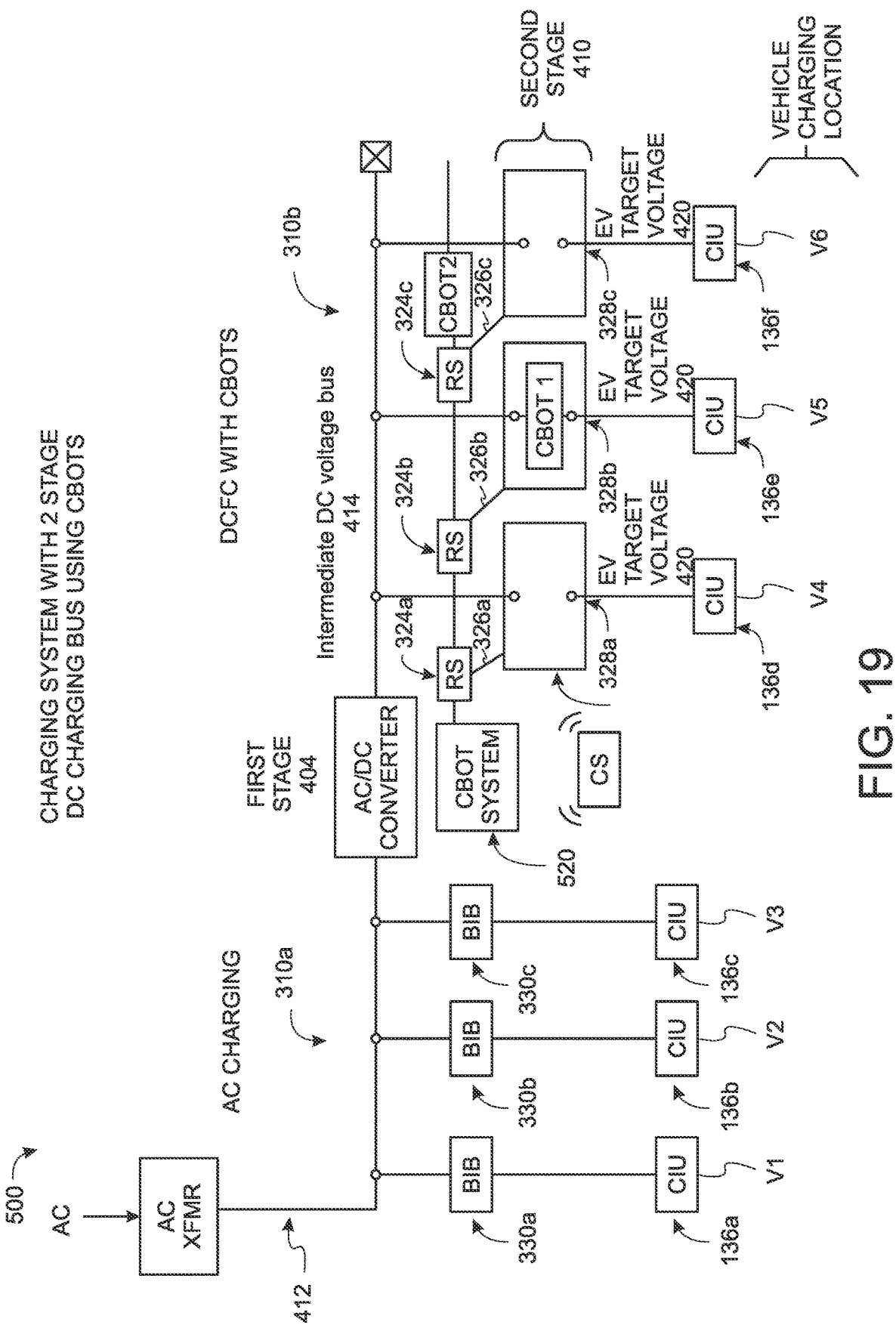
FIG. 19 is a diagram illustrating one example of a charging system having a two stage DC charging system using CBots.

Example 1. Charging System with Two Stage DC Charging Bus Using CBots. AC Charging and DC Charging. FIG. 19 is a diagram illustrating one example of the charging system of Example 1.

In one example, the charging system 500 is located in a parking facility that includes both AC charging locations (spaces e.g., V1, V2, V3) and dedicated DC fast charging locations (spaces e.g., V4, V5, V6). An AC charging bus 310a (e.g., Level 2 charging) is fed from a charging system transformer AC XFMR. The AC charging bus 310a feeds AC charging locations (e.g., using BiBs 330a, 330b, 330c and CIUs 136a, 136b, 136c) as previously described in detail herein. The charging system 500 also includes dedicated DC charging spaces.

First Stage 404. At the start of a series of dedicated DC charging bus/spaces, a first stage 404 AC/DC converter is located that converts the AC charging voltage 412 to an intermediate level DC charging voltage 414. The DC charging bus 310b extends across the dedicated DC charging spaces (e.g., V4, V5, V6) at the Intermediate DC voltage level. DC charging system BIBs are located at each charging location. The BIBs are smart BIBs. Each BIB includes a stage 2 DC to DC converter. When a DCFC request is made, the BIB at the requested location completes the circuit to couple the intermediate DC charging bus to the CIU. The BIB provides the stage 2 DC to DC conversion from the DC bus intermediate voltage to the required EV target voltage.

First Stage 404. At the start of a series of dedicated DC charging bus/spaces, a first stage 404 AC/DC converter is located that converts the AC charging voltage 412 to an intermediate level DC charging voltage 414. The DC charging bus 310b extends across the dedicated DC charging spaces (e.g., V4, V5, V6) at the Intermediate DC voltage level.

Second Stage 410. A CBot charging system 520 runs along the DC charging bus 310b, where the CBot charging system 520 includes a CBot rail and spur system connecting the CBot rail with docking stations. The rail and spur systems can be similar to the rail and spur systems previously described herein. In one example, the CBot charging system includes rail switches 324a, 324b, 324c, spurs 326a, 326b, 326c, and docking stations 328a, 328b, and 328c. Each CBot includes a Stage 2 DC to DC converter that is configured to convert an intermediate DC charging bus voltage to a DC vehicle charging voltage. In operation, when a DCFC request is made, a CBot moves along the CBot rail to the requested charging location, and exits the rail system at a rail switch onto a spur to dock at a desired docking station. The CBot provides the stage 2 DC to DC conversion from the DC bus intermediate voltage to the required EV target voltage. The CBot system 520 and charging CBots are in communication with the charging system 500 control system CS for coordinating charging of an electric vehicle at a desired target charging voltage.

In one or more examples, each CBot (e.g., CBot 1, CBot 2) includes a voltage selector switch and is capable of providing multiple DC charging output voltages based on the requirements of the electric vehicle being charged. In this example, Stage 1 includes a much larger DC/DC converter having higher voltage levels and a much larger power capacity than stage 2 DC/DC circuitry required at each CBot.

Each CIU can be configured to serve multiple charging spaces at each corresponding CIU location.

Figure 20:
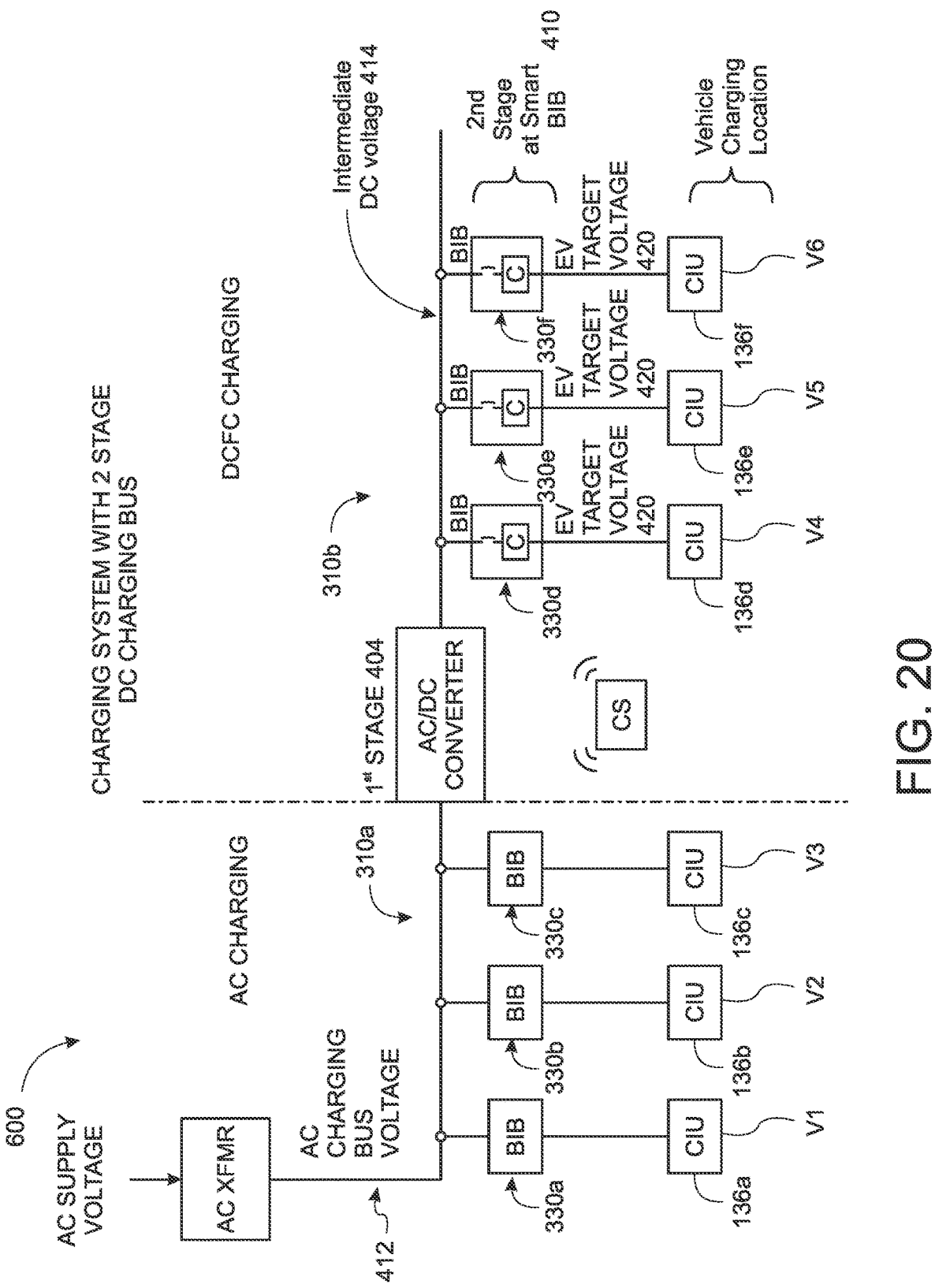
FIG. 20 is a diagram illustrating another example of a charging system with a two stage DC charging system.

Example 2. Charging System with 2 Stage DC Charging Bus Using Smart BiBs. AC Charging and DC Charging. FIG. 20 is a diagram illustrating one example of the charging system 600 with a two stage DC charging system.

In one example, the charging system 600 is located in a parking facility that includes both AC charging locations (spaces e.g., V1, V2, V3) and dedicated DC fast charging locations (spaces e.g., V4, V5, V6). An AC charging bus 310a (e.g., Level 2 charging) is fed from a charging system transformer AC XFMR. The AC charging bus 310a feeds AC charging locations (e.g., using BiBs 330a, 330b, 330c and CIUs 136a, 136b, 136c) as previously described in detail herein. The charging system 600 also includes dedicated DC charging spaces.

First Stage 404. At the start of the dedicated DC charging bus/spaces, a first stage 404 AC/DC converter is located that converts the AC charging voltage 412 to an intermediate level DC charging voltage 414. The DC charging bus 310b extends across the dedicated DC charging spaces (e.g., V4, V5, V6) at the Intermediate DC voltage level. DC charging system BIBs (e.g., 330d, 330e, 330f) are located at each electric vehicle charging location. The BIBs are smart BIBs, and wired or wirelessly communicate with charging system control system CS. Each smart BIB includes a stage 2 DC to DC converter. When a DCFC request is made, the BIB at the requested location completes the circuit to couple the intermediate DC charging bus to the corresponding CIU (e.g., CIU 136*d*, 136*e*, or 136*f*). The corresponding BIB (e.g., BIB 330*d*, 330*e*, or 330*f*) provides the stage 2 DC to DC conversion from the DC bus intermediate voltage 414 to the required EV target voltage 420.

In one or more examples, each BIB 330 includes a voltage selector switch and is capable of providing multiple DC charging output voltages based on the requirements of the electric vehicle being charged. In this example, stage 1 includes a much larger DC/DC converter having higher voltage levels and a much larger power capacity than stage 2 circuitry required at each smart BIB. In one or more examples, each smart BIB includes one or more power semiconductors for coupling between the DC charging bus 310*b* and a corresponding CIU 136*d*, 136*e*, or 136*f*.

Each BIB is independently controllable by the main control system CS for load management operations. Additionally, each BIB and CIU can be configured to serve multiple charging spaces at each corresponding BIB/CIU location.

The term CBot as used herein is a shortened term for charging bot or charging service robot.

It is recognized that the charging system of the present disclosure can be configured for use in many charging system applications, including those not disclosed herein.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The claims are part of the specification.

The invention claimed is:

1. An electric vehicle charging system comprising:
   a first converter that converts an input voltage to an intermediate DC charging voltage;
   an intermediate DC charging bus coupled to the first converter where the intermediate charging voltage is provided to the intermediate DC charging bus; and
   a switching system coupled to the intermediate DC charging bus, where the switching system is associated with a vehicle charging location, the switching system including a second converter located between the intermediate DC charging bus and the vehicle location that converts the intermediate DC charging voltage to a DC charging voltage of a vehicle requesting a charge.

2. The system of claim 1, comprising:
   where the first converter is an AC to DC converter.

3. The system of claim 1, comprising:
   a charging system control system that communicates with the switching system.

4. The system of claim 1, comprising:
   where the switching system includes a voltage selector switch coupled to the second converter that converts the DC charging voltage to a DC target voltage of the vehicle requesting a charge.

5. The system of claim 1, comprising:
   an AC charging bus coupled to the first converter, where the input voltage is an AC voltage.

6. An electric vehicle charging system including a 2 stage charging system comprising:

a first stage that converts an input charging voltage to an intermediate level DC charging voltage;
   an intermediate charging bus coupled to the first stage;
   a charging robot positionable between the intermediate charging bus and a charging location, the charging robot including a second stage that converts the intermediate level DC charging voltage to an electric vehicle target voltage.

7. The system of claim 6, comprising:
   a docking station coupled between the intermediate charging bus and the charging location, the docking station configured to dock the charging robot.

8. The system of claim 7, comprising:
   a charging robot rail system associated with the intermediate charging bus, where the charging robot rail system is configured to move the charging robot between the charging robot rail system and a charging position on the docking station.

9. The system of claim 7, comprising:
   a charging interface unit operably positioned adjacent an electric vehicle charging location, the charging interface unit is electrically coupled to the intermediate DC voltage bus.

10. The system of claim 6, comprising:
   a charging interface unit operably positioned adjacent to an electric vehicle charging location, the charging interface unit is electrically coupled to the intermediate DC voltage bus and includes a charging cable that charge couples to an electric vehicle.

11. The system of claim 6, comprising:
   an AC charging bus coupled to the first stage converter.

12. The system of claim 5, comprising:
   a bus interface unit coupled to the AC charging bus, the bus interface unit including a switch for selectively charge coupling to a vehicle requesting a charge.

13. An electric vehicle charging system comprising:
   an AC power bus;
   a first converter coupled to the AC power bus that converts an AC input voltage to an intermediate DC charging voltage;
   an intermediate DC charging bus coupled to the first converter; and
   a switching system coupled to the intermediate DC charging bus, where the switching system is associated with a vehicle charging location, the switching system including a second converter that converts the intermediate DC charging voltage to a DC charging voltage of a vehicle requesting a charge.

14. The electric vehicle charging system of claim 13, comprising:
   the switching system including a charging robot positionable between the intermediate DC charging bus and a charging location, the charging robot including a second stage that converts the intermediate level DC charging voltage to an electric vehicle target voltage.

15. The electric vehicle charging system of claim 14, comprising:
   a docking station coupled between the intermediate DC charging bus and the charging location, the docking station configured to dock the charging robot.

16. The electric vehicle charging system of claim 15, comprising:
   a charging robot rail system associated with the intermediate DC charging bus, where the charging robot rail system is configured to move the charging robot between the charging robot rail system and a charging position on the docking station.

17. The electric vehicle charging system of claim 13, comprising:

a charging interface unit operably positioned adjacent to an electric vehicle charging location, the charging interface unit is electrically coupled to the intermediate DC voltage bus and includes a charging cable that charge couples to an electric vehicle.

18. The electric vehicle charging system of claim 13, comprising:

a bus interface unit coupled to the AC power bus, the bus interface unit including a power switch for selectively charge coupling the AC power bus to a charging location; and a charging interface unit positioned at the charging location, the charging interface unit being coupled to the bus interface unit.

19. The electric vehicle charging system of claim 18, where the power switch comprises one or more power semiconductor switching units.

20. The electric vehicle charging system of claim 18, where the bus interface unit is addressable, and the power switch is controllable via a remotely located control system.

* * * * *